(12) United States Patent
Sexton et al.

(10) Patent No.: US 8,789,281 B1
(45) Date of Patent: Jul. 29, 2014

(54) HYDRODYNAMIC LUBRICATION MADE POSSIBLE BY THE WEARING-IN OF SUPERHARD BEARING ELEMENTS OVER TIME

(75) Inventors: Timothy N. Sexton, Genola, UT (US); Craig H. Cooley, Saratoga Springs, UT (US); Cody W. Knuteson, Salem, UT (US)

(73) Assignee: US Synthetic Corporation, Orem, UT (US)

(*) Notice: Subject to any disclaimer, the term of this patent is extended or adjusted under 35 U.S.C. 154(b) by 504 days.

(21) Appl. No.: 13/070,633

(22) Filed: Mar. 24, 2011

(51) Int. Cl.
*E21B 4/02* (2006.01)

(52) U.S. Cl.
USPC ............... 29/898.13; 29/898.041; 29/898.09

(58) Field of Classification Search
USPC ............. 29/898, 898.13, 898.041, 898.04, 29/898.07, 898.09, 898.03, 898.042; 384/121, 122, 420
See application file for complete search history.

(56) References Cited

U.S. PATENT DOCUMENTS

| | | | |
|---|---|---|---|
| 3,597,027 | A | 8/1971 | Herndon |
| 3,837,718 | A | 9/1974 | Nattefort |
| 4,141,605 | A | 2/1979 | Riordan et al. |
| 4,227,753 | A | 10/1980 | Wilcock |
| 4,437,215 | A * | 3/1984 | Nozue et al. ............ 29/898.041 |
| 4,560,014 | A | 12/1985 | Geczy |
| 4,732,491 | A | 3/1988 | Geczy |
| 4,854,401 | A | 8/1989 | Kruger et al. |
| 5,364,192 | A | 11/1994 | Damm et al. |
| 5,366,298 | A | 11/1994 | Toshimitsu et al. |
| 5,660,481 | A | 8/1997 | Ide |
| 6,460,635 | B1 | 10/2002 | Kalsi et al. |
| 6,461,129 | B2 | 10/2002 | Liu |
| 7,842,111 | B1 | 11/2010 | Sani |
| 7,866,418 | B2 | 1/2011 | Bertagnolli et al. |
| 7,901,137 | B1 | 3/2011 | Peterson |
| 2004/0190804 | A1 | 9/2004 | John et al. |
| 2008/0035246 | A1* | 2/2008 | Kawamura et al. ........... 148/318 |
| 2010/0218995 | A1 | 9/2010 | Sexton et al. |

FOREIGN PATENT DOCUMENTS

| | | |
|---|---|---|
| EP | 0543461 | 5/1993 |
| EP | 0595630 | 5/1994 |
| GB | 1392245 | 4/1975 |
| WO | WO 2009/015338 | 1/2009 |

OTHER PUBLICATIONS

U.S. Appl. No. 12/854,337, filed Aug. 11, 2010, Sexton et al.

(Continued)

*Primary Examiner* — Christopher Besler
(74) *Attorney, Agent, or Firm* — Dorsey & Whitney LLP

(57) ABSTRACT

Methods of wearing-in superhard bearing elements over time so that hydrodynamic or near hydrodynamic lubrication of opposed bearing surfaces develops and thrust-bearing apparatuses. In an embodiment, a thrust-bearing apparatus including first and second thrust-bearing assemblies is received or provided. Each thrust-bearing assembly includes a support ring and a plurality of superhard bearing elements mounted circumferentially around the support ring. The superhard bearing elements of each thrust-bearing assembly are oriented so as to be opposed to one another. The thrust-bearing apparatus is operated so as to wear-in the bearing surfaces of both thrust-bearing assemblies such that the bearing surfaces of the superhard bearing elements of each thrust-bearing assembly substantially correspond to one another and become very smooth providing for at least near hydrodynamic operation in which a fluid film is present between the bearing surfaces of the first and second thrust-bearing assemblies so as to limit contact therebetween.

20 Claims, 41 Drawing Sheets

(56) References Cited

OTHER PUBLICATIONS

U.S. Appl. No. 12/854,337, May 7, 2013, Office Action.
International Search Report and Written Opinion from International Application No. PCT/US2011/044774 mailed Dec. 13, 2012.
U.S. Appl. No. 13/241,412, filed Sep. 23, 2011, Cooley et al.
U.S. Appl. No. 11/545,929, filed Oct. 10, 2006, Bertagnolli et al.
International Search Report and Written Opinion from International Application No. PCT/US2012/056407 mailed Dec. 7, 2012.
U.S. Appl. No. 12/854,337, Nov. 19, 2012, Office Action.
U.S. Appl. No. 12/854,337, Oct. 1, 2013, Office Action.
U.S. Appl. No. 12/854,337, Apr. 8, 2014, Notice of Allowance.

* cited by examiner

US 8,789,281 B1

HYDRODYNAMIC LUBRICATION MADE POSSIBLE BY THE WEARING-IN OF SUPERHARD BEARING ELEMENTS OVER TIME

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that does not rotate relative to the motor housing and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid is circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and lubricate the bearing elements of the thrust-bearing apparatuses.

The on-bottom and off-bottom thrust carried by the thrust-bearing apparatuses can be extremely large. The operational lifetime of the thrust-bearing apparatuses often determines the useful life of the subterranean drilling system. Therefore, manufacturers and users of subterranean drilling systems continue to seek improved bearing apparatuses and operation methods to extend the useful life of such bearing apparatuses.

SUMMARY

Various embodiments of the invention relate to methods of wearing-in superhard bearing elements of a thrust-bearing apparatus over time so that the thrust-bearing apparatus may operate hydrodynamically. For example, a thrust-bearing apparatus including first and second thrust-bearing assemblies is provided or received. Each thrust-bearing assembly includes a support ring and a plurality of superhard bearing elements mounted on the support ring and distributed circumferentially about a thrust axis. The thrust-bearing apparatus is operated to wear-in bearing surfaces of the superhard bearing elements of the thrust-bearing apparatus. In operation, the bearing surfaces of the superhard bearing elements are smoothed so as to substantially correspond to one another to provide for at least near hydrodynamic operation in which a fluid film or partial fluid film develops between the bearing surfaces of the first and second thrust-bearing assemblies. The fluid film may help prevent or limit contact between the opposing bearing surfaces of the first and second thrust-bearing assemblies. Such a fluid film significantly reduces friction and heat generation.

In one embodiment, the support ring of at least one of the bearing assemblies comprises one or more thermal-warping reducing features configured to reduce a radial moment of the bearing assembly. By reducing thermal warping in the support ring when it is exposed to elevated operational temperature conditions, the extent to which respective bearing surfaces of the bearing assembly are displaced out of plane from each other may be limited, which further promotes hydrodynamic operation.

Wearing-in of the bearing surfaces allows the surfaces to be manufactured with an initially relatively rough surface finish (e.g., at least about 20 microinch Ra), while allowing smoothing and matching of opposed bearing surfaces during wear-in.

In an embodiment, a thrust-bearing apparatus capable of being worn-in under specific conditions is disclosed. The thrust-bearing apparatus includes a rotor and a stator. The rotor and stator each include a support ring and a plurality of superhard bearing elements mounted to the support ring and distributed about a thrust axis. The rotor and the stator are configured so that bearing surfaces of the superhard bearing elements of the rotor and stator wear-in to substantially correspond to one another to allow for at least near hydrodynamic operation in which a fluid film is present between the bearing surfaces of the rotor and stator during operation. The rotor and stator are further configured so that the wearing-in is achieved in less than about 3 hours, under a thrust load of at least about 5,000 lbs, and at a rotational speed of at least about 60 RPM while at least partially submersed in mineral oil. When the bearing surfaces are worn-in, the thrust-bearing apparatus may exhibit a coefficient of friction ("COF") that is no more than about 0.06 when the thrust-bearing apparatus is tested while being at least partially immersed in the mineral oil.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to similar or identical elements or features in different views or embodiments shown in the drawings.

DETAILED DESCRIPTION

I. Introduction

Embodiments of the invention relate to methods of wearing-in superhard bearing elements of a thrust-bearing apparatus over time so that hydrodynamic lubrication of opposed bearing surfaces of the superhard bearing elements develops to thereby enable hydrodynamic operation. In an embodiment, a thrust-bearing apparatus including first and second thrust-bearing assemblies is received or provided. Each thrust-bearing assembly includes a support ring and a plurality of superhard bearing elements mounted to the support ring and distributed circumferentially around a thrust axis. The superhard bearing elements of each thrust-bearing assembly are oriented generally opposed to one another. The thrust-bearing apparatus is operated so as to wear-in bearing surfaces of the superhard bearing elements of each of the thrust-bearing assemblies such that bearing surfaces substantially correspond to one another over a majority (e.g., substantially all) of the radial extent of the bearing surface. Breaking-in/wearing-in the bearing surfaces of the superhard bearing elements enables the thrust-bearing apparatus to be operated hydrodynamically (or nearly hydrodynamically) in which a fluid film (or a partial fluid film that nearly covers the interfacing surfaces) is present between the bearing surfaces of the first thrust-bearing assembly and the bearing surfaces of the second thrust-bearing assembly that limits contact therebetween to thereby reduce friction and heat generation.

II. Methods for Wearing-in of Superhard Bearing Elements

Figure 1:
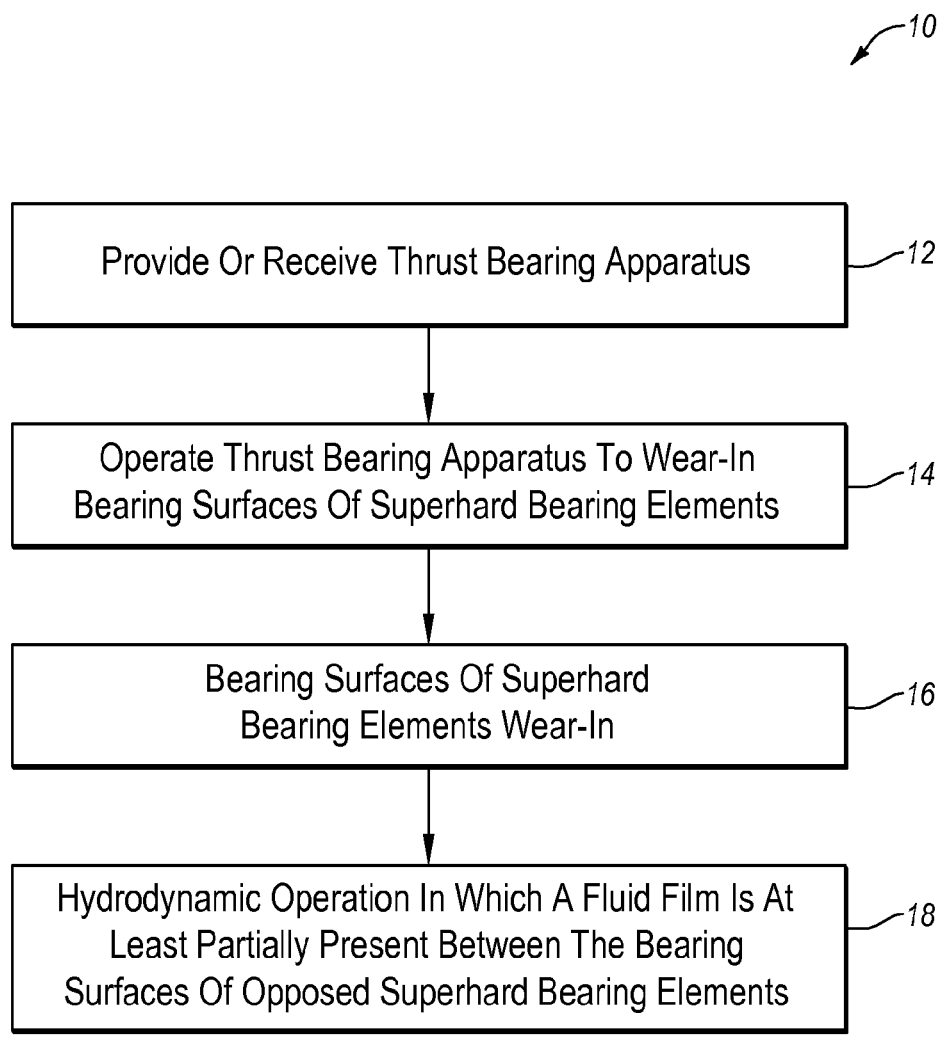
FIG. 1 is a flow chart of an embodiment of a method of wearing-in superhard bearing elements to enable hydrodynamic operation of a thrust-bearing apparatus.

FIG. 1 is a flow chart depicting an embodiment of a method 10 for wearing-in bearing surfaces of superhard bearing elements of a thrust-bearing apparatus to enable hydrodynamic operation. In act 12, a thrust-bearing apparatus is provided or received (e.g., the thrust-bearing apparatus may be broken or worn-in by the manufacturer, the end-user, a third party, or combinations of the foregoing). In act 14, the thrust-bearing apparatus is operated so as to wear-in the bearing surfaces of the superhard bearing elements. Specifically, the opposed bearing surfaces of the superhard bearing elements of the stator and rotor that form the thrust-bearing apparatus are mechanically worn-in. As the thrust-bearing apparatus is operated, over time, in act 16, the opposed bearing surfaces of the superhard bearing elements become increasingly smooth (i.e., worn-in) so that the geometry of the opposed bearing surfaces substantially correspond to one another. Stated another way, the surface profile of the bearing surfaces wear-in so that the surface profile of the bearing surfaces of the superhard bearing elements of the stator substantially correspond and match to the surface profile of the bearing surfaces of the superhard bearing elements of the rotor.

Once the bearing surfaces substantially correspond to one another, hydrodynamic operation or near hydrodynamic operation of the thrust-bearing apparatus becomes possible in which a fluid film develops between the opposed bearing surfaces of the superhard bearing elements of the stator and rotor. By near hydrodynamic operation, it is meant that the fluid film may not extend completely over the opposed bearing surfaces, but that the fluid film partially extends over these surfaces (e.g., at least about 50%). The fluid film helps limit (e.g., prevent) contact between the bearing surfaces of the rotor and stator. In act 18, hydrodynamic operation of the thrust-bearing apparatus is characterized by lowered friction, decreased heat generation, and increased operation life of the superhard bearing elements.

III. Bearing Assemblies and Apparatuses

The method 10 shown in FIG. 1 for wearing-in superhard bearing elements may be employed with any thrust-bearing apparatus. However, the method 10 is well-suited for use in wearing-in the superhard bearing elements of a thrust-bearing apparatus that is specifically configured for hydrodynamic operation. Accordingly, some embodiments for the thrust-bearing assemblies employed in the method 10 include one or more features to reduce thermal warping under operational temperature conditions. The reduction of such thermal warping further promotes the development of hydrodynamic operation resulting from the inventive wearing-in method. Specifically, such features may be configured to reduce thermal warping of the support ring of the thrust-bearing assembly. By reducing thermal warping in the support ring when it is exposed to elevated operational temperature conditions, the extent to which respective bearing surfaces of the thrust-bearing assembly are displaced out of plane from each other may be limited to thereby promote hydrodynamic operation when used in a thrust-bearing apparatus. The disclosed thrust-bearing apparatuses may be used in a number of applications, such as downhole motors in subterranean drilling systems, directional drilling systems, pumps, transmissions, gear boxes, and many other applications.

Figure 2A:
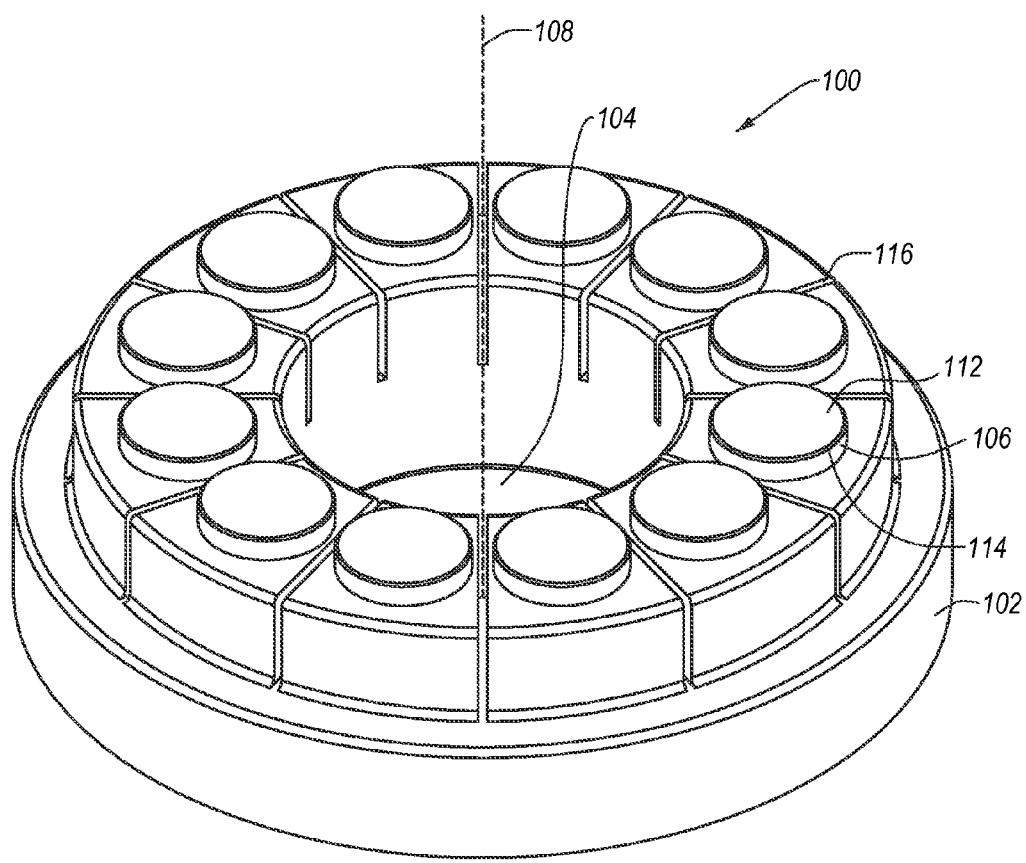
FIG. 2A is an isometric view of an embodiment of a thrust-bearing assembly including a support ring having a plurality of radially-extending slots therein configured to reduce thermal warping under operational temperature conditions.
Figure 2B:
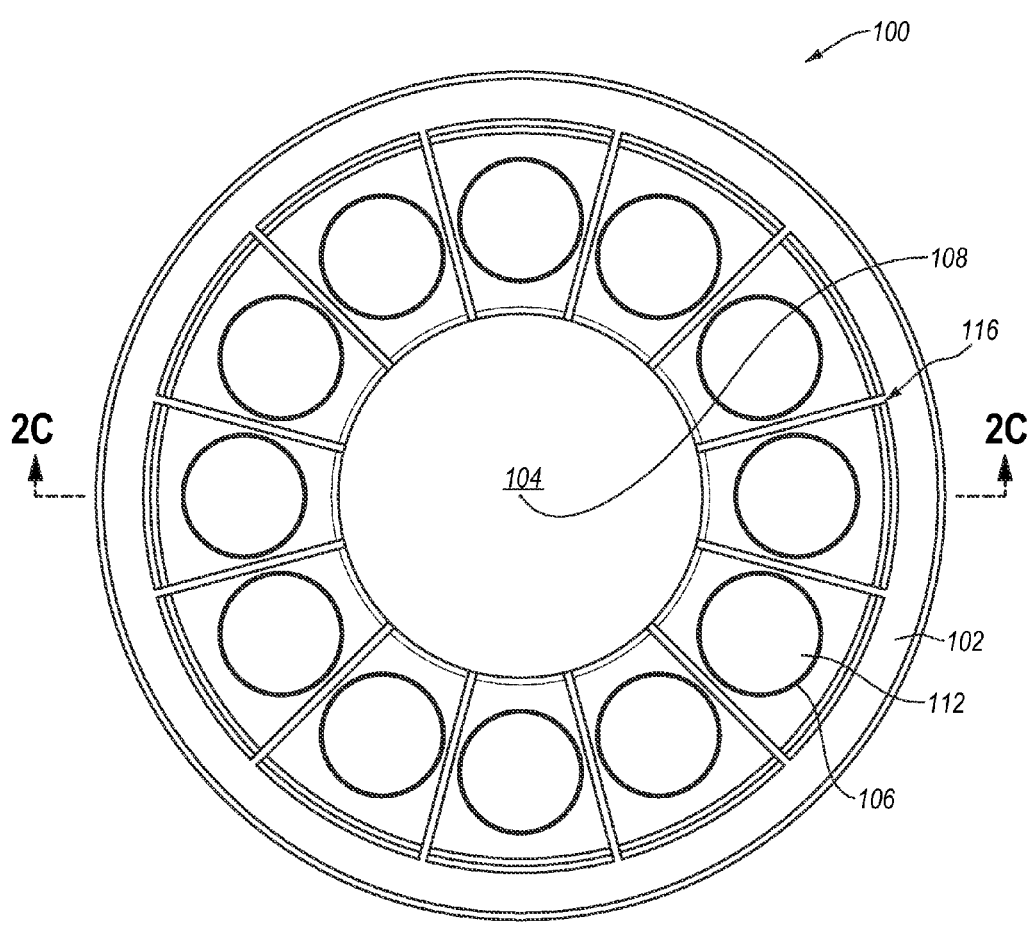
FIG. 2B is a top plan view of the thrust-bearing assembly shown in FIG. 2A.
Figure 2C:
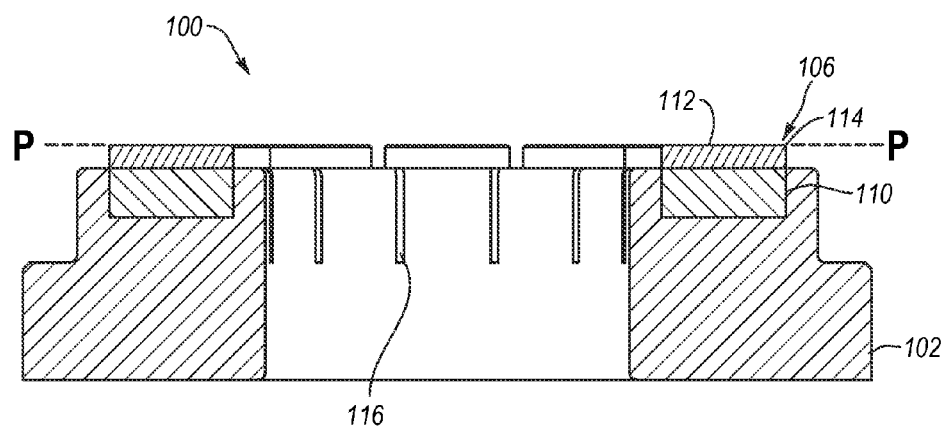
FIG. 2C is a side cross-sectional view of the thrust-bearing assembly shown in FIG. 2B taken along line 2C-2C.

FIGS. 2A-2C are isometric, top plan, and side cross-sectional views, respectively, of an embodiment of a thrust-bearing assembly 100. The thrust-bearing assembly 100 may form a stator or a rotor of a thrust-bearing apparatus used in a subterranean drilling system. The thrust-bearing assembly 100 includes a support ring 102 defining an opening 104 through which a shaft (not shown) of, for example, a downhole drilling motor may extend. The support ring 102 may be made from a variety of different materials. For example, the support ring 102 may comprise carbon steel, stainless steel, tungsten carbide, or another suitable material. The support ring 102 may include a plurality of recesses 110 (FIG. 2C) formed therein.

The thrust-bearing assembly 100 further includes a plurality of superhard bearing elements 106 that are distributed circumferentially about a thrust axis 108 along which a thrust force may be generally directed during use. As used herein, a superhard bearing element is a bearing element including a bearing surface that is made from a superhard material. As used herein, a superhard material is a material exhibiting a hardness that is at least as hard as tungsten carbide. Examples of superhard materials include, but are not limited to, polycrystalline diamond, polycrystalline cubic boron nitride, silicon carbide, silicon nitride, tungsten carbide, or any combination of the foregoing.

Although the superhard bearing elements 106 are illustrated as being cylindrical, in other embodiments, the superhard bearing elements 106 may be non-cylindrical such as oblong or other non-cylindrical geometry. Each superhard bearing element 106 is partially disposed in a corresponding one of the recesses 110 (FIG. 2C) of the support ring 102 and secured partially therein via brazing, press-fitting, fastening with a fastener, or another suitable technique. Each superhard bearing element 106 includes a bearing surface 112 that is substantially planar and generally lies in a common plane P (FIG. 2C) with the bearing surfaces 112 of the other superhard bearing elements 106. The superhard bearing elements 106 may be pre-machined to tolerances and mounted in the support ring 102 and/or mounted to the support ring 102 and the bearing surfaces 112 thereof and planarized (e.g., by lapping and/or grinding) so that the bearing surfaces 112 are all substantially coplanar. Optionally, one or more of the superhard bearing elements 106 may exhibit a peripherally-extending edge chamfer 114. However, in other embodiments, the edge chamfer 114 may be omitted.

The bearing surfaces 112 are manufactured (e.g., by lapping) so as to have an initial fairly coarse surface roughness. Because it can be relatively expensive to provide very smooth surface roughness (e.g., less than about 5 microinch Ra), the bearing surfaces 112 may be machined to an initial surface roughness that is relatively rough (e.g., at least about 20 microinch Ra) and wherein the bearing surface 112 is smoothed further while being worn-in. For example, the initial surface roughness may be between about 20 microinch Ra and about 45 microinch Ra, more typically between about 25 microinch Ra and about 40 microinch Ra, and even more typically between about 30 microinch and about 35 microinch Ra.

During wear-in, the bearing surfaces 112 of the stator and rotor smooth one another, as a first diamond or other superhard surface laps or rubs against a second opposing diamond or other superhard surface, increasing the smoothness (i.e., lowering the surface roughness Ra value) so that the surface roughness value after being worn-in is less than that exhibited immediately after manufacture. Such rubbing of diamond against diamond does not destroy either bearing surface, but rather results in a fine surface finish, as well as matching of the geometry of the opposed bearing surfaces of the rotor and stator across at least a majority (e.g., substantially all) of the radial width of each of the bearing elements. The bearings are maintained at a sufficiently cool temperature (e.g., with lubricant) during wear in to avoid damage to the superhard surface. Furthermore, with such lapping, there is little to no risk of one material "grabbing" the other and pulling it out, resulting in for example gouging. This allows the bearing surfaces 112 to be manufactured at relatively lower cost, while also allowing the bearing surfaces 112 to become increasingly smooth during wear-in, eventually resulting in hydrodynamic or near hydrodynamic operation and increased life of the components.

The bearing surfaces 112 may exhibit a surface roughness across a majority of their respective radial widths between about 0.1 microinch Ra and about 10 microinch Ra after being worn in. More typically, the surface roughness may be between about 0.5 microinch and about 5 microinch, even more typically between about 1 microinch and about 3 microinch after being worn-in.

In some embodiments, the support ring 102 may further include one or more thermal-warping-reducing features 116, which compared to if they were absent, increase the compliance of the support ring 102 and reduces a radial moment that is thermally induced in the support ring 102 due to a temperature gradient in the support ring 102. The temperature of the thermal gradient in the support ring 102 increases as the bearing surfaces 112 of the superhard bearing elements 106 are approached (i.e., the temperature is hottest at the bearing surfaces 112). The thermal gradient is generated by the frictional heat generated at the bearing surfaces 112 of the superhard bearing elements 106 during use. In the illustrated embodiment, each thermal-warping-reducing feature 116 is configured as a radially-extending slot that extends partially through the support ring 102 in a thickness direction.

Each radially-extending slot 116 may be disposed between immediately adjacent superhard bearing elements 106, and may be disposed circumferentially about halfway between immediately adjacent superhard bearing elements 106. For example, each radially-extending slot 116 may exhibit a width of about 0.0020 inch to about 0.100 inch, such as about 0.030 inch to about 0.050 inch, about 0.035 inch to about 0.045 inch, or about 0.010 inch to about 0.040 inch. However, in other embodiments, at least one, a portion of, or all of the thermal-warping-reducing features 116 may be configured as a recess, a blind or through hole, or other feature that departs from the depicted elongated geometry of the radially-extending slots.

As will be discussed in more detail below, the radially-extending slots 116 increase the compliance of the support ring 102 compared to if they were absent. By increasing the compliance of the support ring 102, a radial moment that is thermally induced in the support ring 102 due to the temperature gradient in the support ring 102 may also be reduced. Such a configuration may reduce or eliminate any tendency of the bearing surfaces 112 of the superhard bearing elements 106 to be displaced out of the plane P.

Figure 2D:
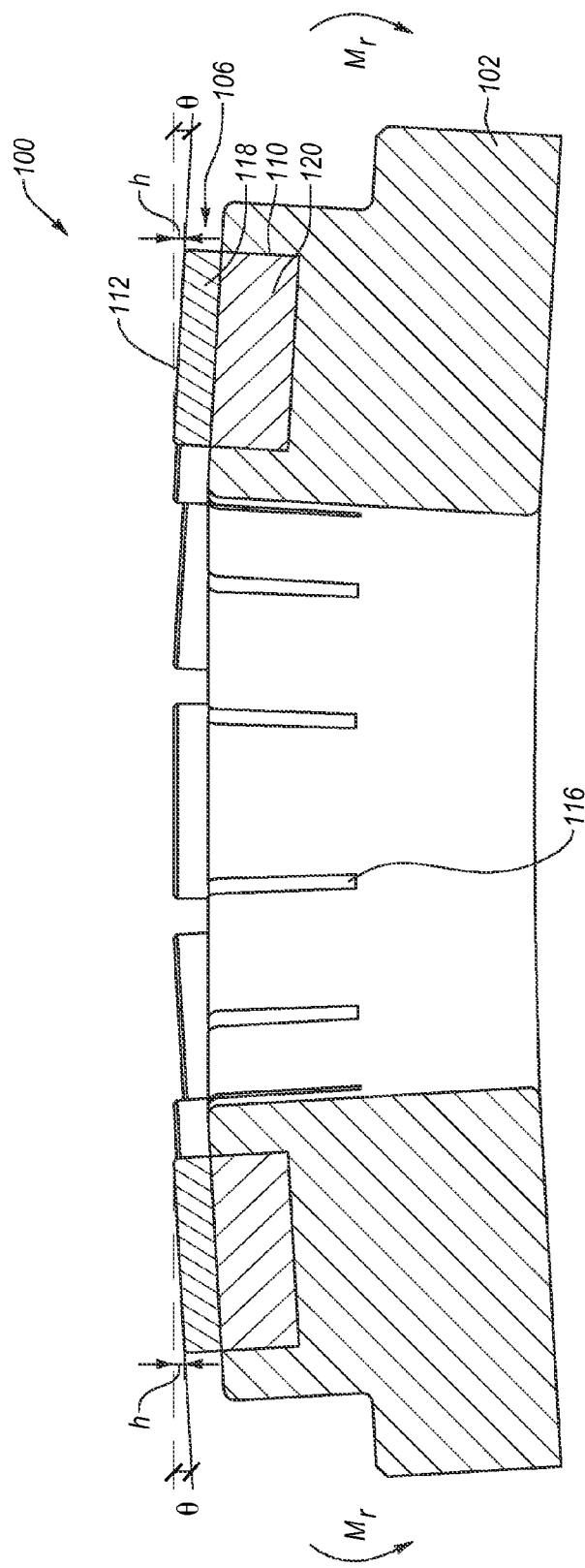
FIG. 2D is the side cross-sectional view of the thrust-bearing assembly shown in FIG. 2C depicting how the support ring warps under operational temperature conditions.

FIG. 2D is the side cross-sectional view of the thrust-bearing assembly 100 shown in FIG. 2C depicting how the support ring 102 may warp under operational temperature conditions. Operational temperature conditions are temperatures commonly experienced when the thrust-bearing assembly 100 is used in a downhole drilling motor. For example, the operational temperature conditions that the support ring 102 and the bulk of the superhard bearing elements 106 may be subjected to during downhole drilling operations are at least about 100° C., such as about 100° C. to about 200° C. or, more particularly, about 100° C. to about 150° C. Under operational temperature conditions, the support ring 102 tends to warp (e.g., twist) due to a radial moment $M_r$ thermally induced therein due to the temperature gradient in the support ring 102, with the temperature of the thermal gradient increasing with distance toward the bearing surfaces 112 of the superhard bearing elements 106.

At a maximum, under the operational temperature conditions, the support ring 102 may warp so that the bearing surfaces 112 of the superhard bearing elements 106 may be displaced out of plane by an angle θ, such as about 0.02 degree to about 0.2 degree. Stated another way (and based on typical bearing dimensions), an outermost peripheral edge of each superhard bearing element 106 may be displaced out of plane by a distance h of about 0.00020 inch to about 0.0020 inch, such as about 0.0005 inch to about 0.0010 inch, which is also referred to as the maximum flatness. Although these values are predicted based on the design, measured values are believed to be similar.

Figure 3A:
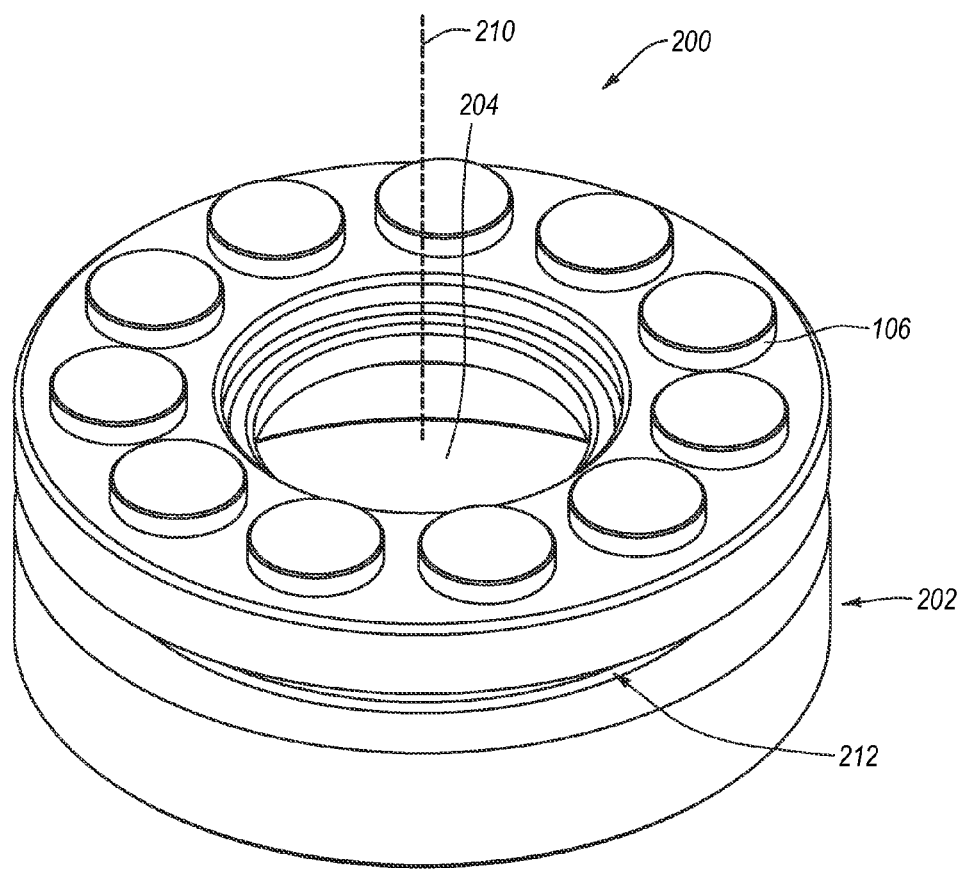
FIG. 3A is an isometric view of an embodiment of a thrust-bearing assembly including a support ring configured to accommodate minor thermal warping of another thrust-bearing assembly with which it is operably assembled.
Figure 3B:
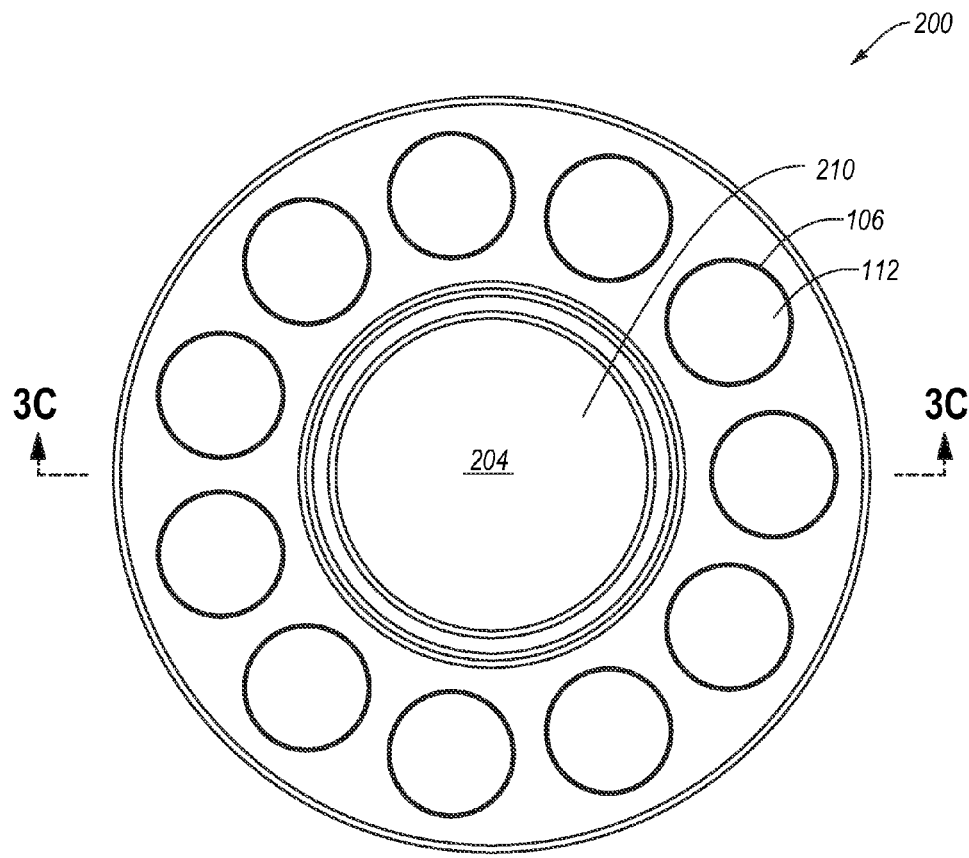
FIG. 3B is a top plan view of the thrust-bearing assembly shown in FIG. 3A.
Figure 3C:
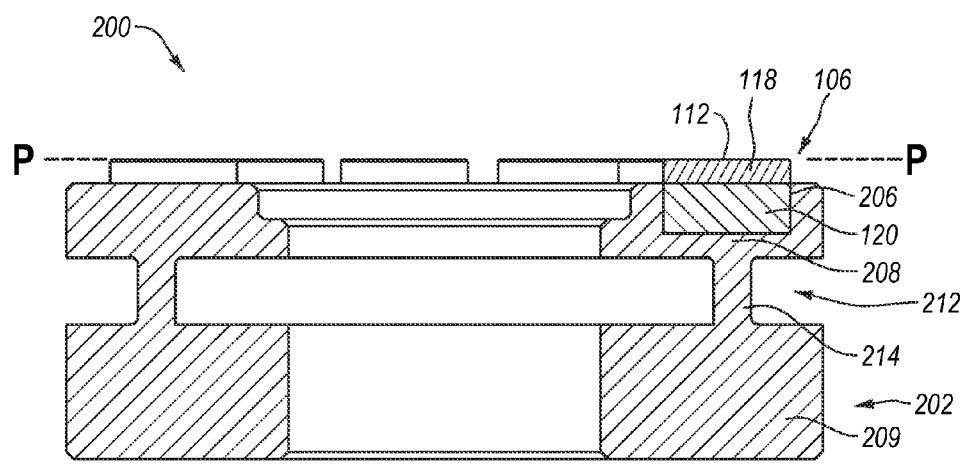
FIG. 3C is a side cross-sectional view of the thrust-bearing assembly shown in FIG. 3B taken along line 3C-3C.

FIGS. 3A-3C are isometric, plan, and side cross-sectional views, respectively, of another embodiment of a thrust-bearing assembly 200. The support ring 202 further includes an outer circumferentially-extending recess 212 that is defined by the upper base 208, a circumferentially-extending flexible support 214, and a lower base 209. The recess 212 is positioned below the plurality of recesses 206. The recess 212 increases the compliance of the support ring 202 compared to if it were absent from the support ring 202. In an embodiment, the recess 212 may exhibit a thickness of about 0.250 inch to about 1.00 inch (e.g., about 0.300 inch to about 0.600 inch) and extend radially inwardly about 0.200 inch to about 0.500 inch (e.g., about 0.200 inch to about 0.300 inch).

Figure 3D:
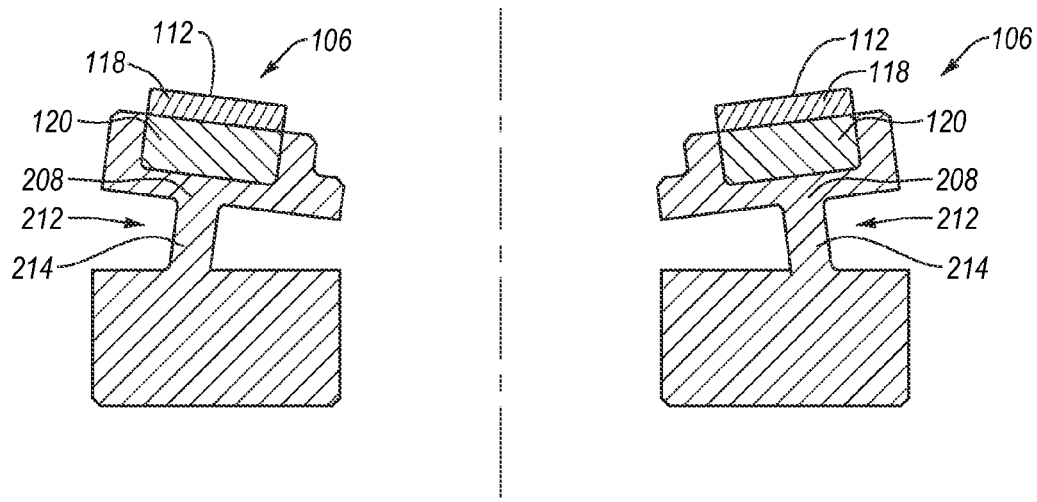
FIG. 3D is a simplified side cross-sectional view of the thrust-bearing assembly shown in FIG. 3C depicting how the support ring can bend.

As shown in the simplified side cross-sectional view of FIG. 3D, the upper base 208 carrying the superhard bearing elements 106 thereon may pivot and/or slightly rotate when one or more of the superhard bearing elements 106 are loaded (e.g., at or near an edge of one or more of the bearing surfaces 112 of the superhard bearing elements 106). As illustrated, the upper base 208 may pivot radially inwardly in response to the bearing surfaces 112 of the superhard bearing elements 106 being loaded more at or near the inner most portion thereof so that the bearing surfaces 112 may accommodate the bearing surfaces of another thrust-bearing assembly being slightly out of plane with each other.

Figure 4A:
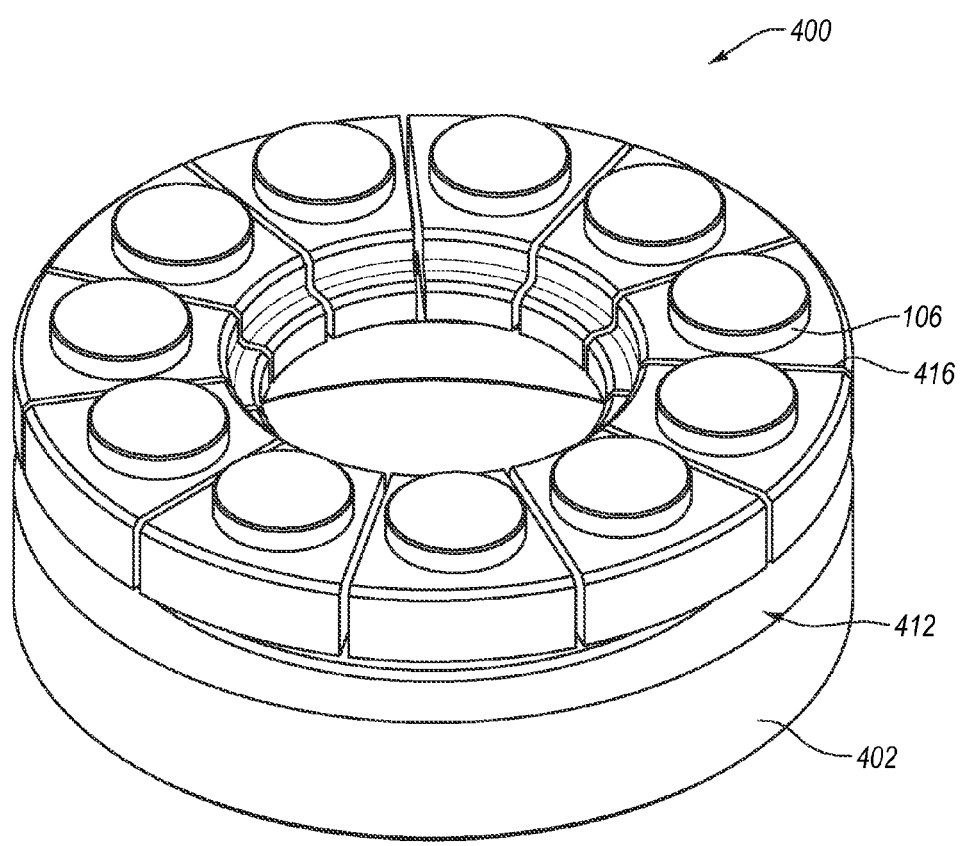
FIG. 4A is an isometric view of another embodiment of a thrust-bearing assembly including a support ring configured to accommodate minor thermal warping of another thrust-bearing assembly with which it is operably assembled.
Figure 4B:
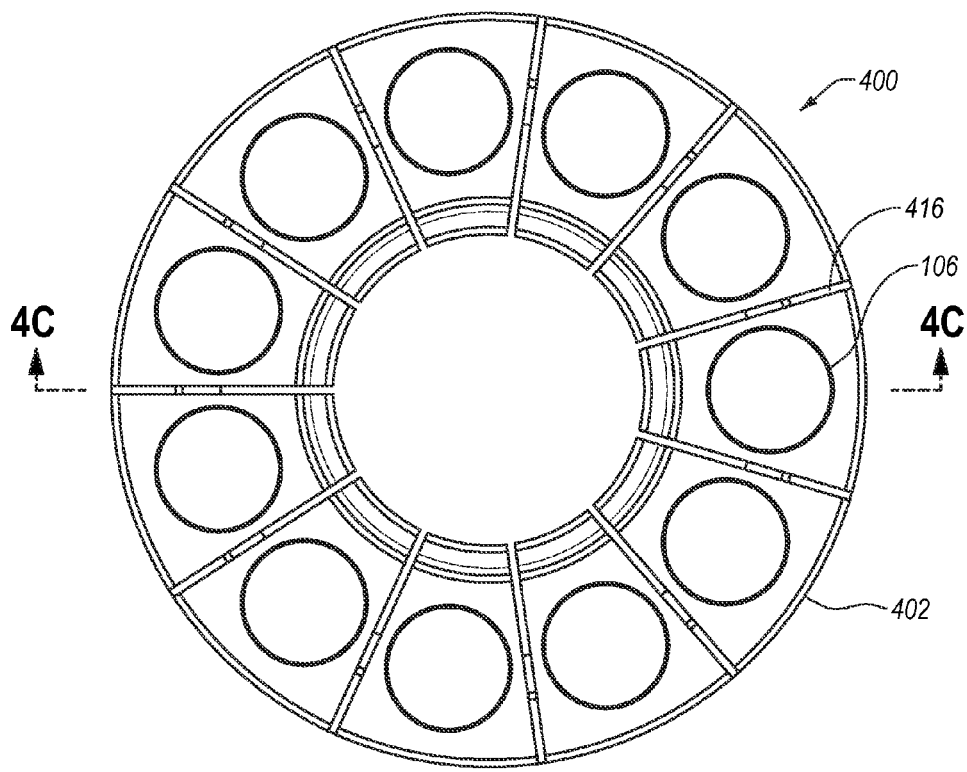
FIG. 4B is a top plan view of the thrust-bearing assembly shown in FIG. 4A.
Figure 4C:
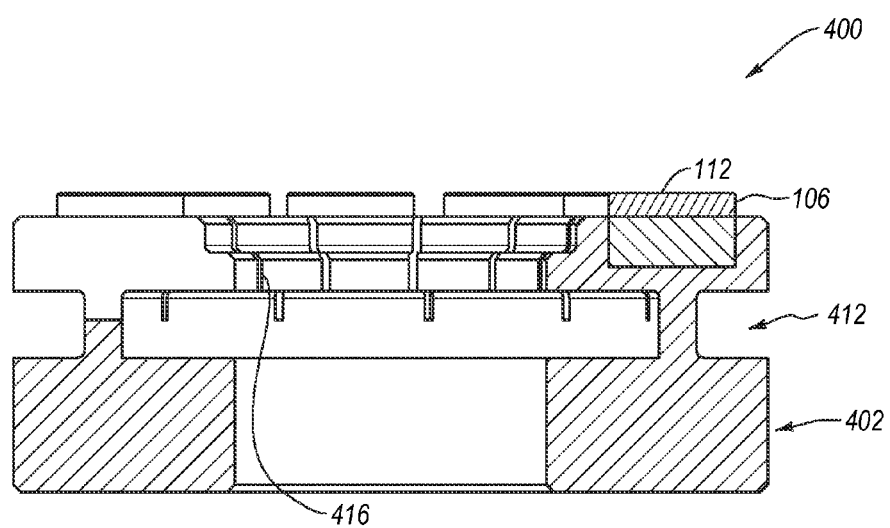
FIG. 4C is a side cross-sectional view of the thrust-bearing assembly shown in FIG. 4B taken along line 4C-4C

FIGS. 4A-4C are isometric, top plan, and side cross-sectional views of an embodiment of a thrust-bearing assembly 400 having similarities to both the thrust-bearing assembly 100 and the thrust-bearing assembly 200. The thrust-bearing assembly 400 includes a support ring 402 having a plurality of radially-extending slots 416 therein, similar to slots 116 of the thrust-bearing assembly 100, but also includes a recess 412, similar to recess 212 of the thrust-bearing assembly 200. Any of the previously described thrust-bearing assemblies may be used in a thrust-bearing apparatus that employs two thrust-bearing assemblies.

Figure 5A:
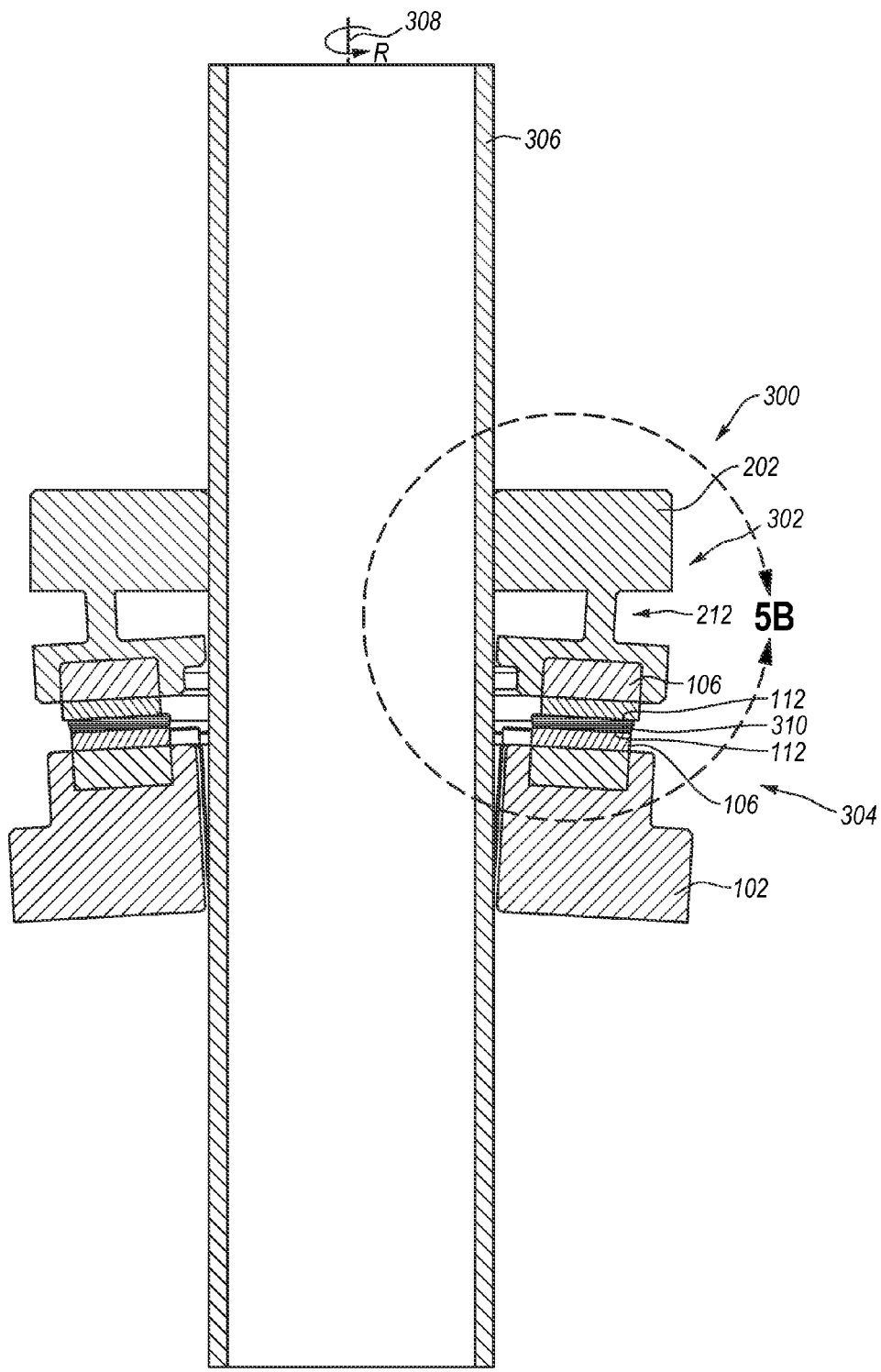
FIG. 5A is a side cross-sectional view of an embodiment of a thrust-bearing apparatus that may include a stator configured as the thrust-bearing apparatus shown in FIGS. 2A-2D and a rotor configured as the thrust-bearing apparatus shown in FIGS. 3A-3D.

FIG. 5A is an isometric view of an embodiment of a thrust-bearing apparatus 300. The thrust-bearing apparatus 300 includes a rotor 302 that is configured as the thrust-bearing assembly 200 shown in FIGS. 3A-3D and a stator 304 that is configured as the thrust-bearing assembly 100 shown in FIGS. 2A-2D. The rotor 302 may be attached to and rotate with a shaft 306. While the stator 304 is shown configured as the thrust-bearing assembly 100 shown in FIGS. 2A-2D, in other embodiments, the rotor 302 may be configured as the thrust-bearing assembly 100 and the stator 304 may be configured as the thrust-bearing assembly 200 shown in FIGS. 3A-3D. In other embodiments, either the rotor or stator may not include any thermal warping reducing features.

The shaft 306 may, for example, be operably coupled to an apparatus capable of rotating the shaft 306 in a direction R (or in an opposite direction) about a rotation axis 308, such as a downhole motor. For example, the shaft 306 may extend through and may be secured to the rotor 302 by press-fitting or threadly coupling the shaft 306 to the rotor 302, or another suitable technique. The stator 304 is not connected to the shaft 306 and, therefore, remains stationary while the rotor 302 rotates. The respective bearing surfaces 112 of the superhard bearing elements 106 of the rotor 302 are oriented to generally oppose the respective bearing surfaces 112 of the superhard bearing elements 106 of the stator 304.

In operation, rotation of the rotor 302 at a sufficient rotational speed and after a wear-in period in accordance with the method 10 (FIG. 1) allows a fluid film 310 to develop between the bearing surfaces 112 of the stator 304 and the bearing surfaces 112 of the rotor 302. In an embodiment, the fluid film 310 may extend completely across the interface between bearing surfaces 112 to provide hydrodynamic operation, or the fluid film may only partially extend across the interface between the bearing surfaces, providing nearly hydrodynamic operation. In an embodiment, the fluid film 310 extends over at least about 50% of the surface area of the bearing surfaces 112. In another, the fluid film extends over at least about 75%, at least about 90%, or at least about 95% of the surface area of the bearing surfaces 112. The fluid film may develop first near the center of bearing surface 112 and spread radially outward as wear-in progresses.

The fluid film 310 may develop under certain operational conditions in which bearing surfaces 112 have been worn-in, the rotational speed of the rotor 302 is sufficiently large and the thrust load is sufficiently low. Under such hydrodynamic operational conditions, the pressure of the fluid film 310 is sufficient to prevent or limit contact between the bearing surfaces 112 of the stator 304 and the bearing surfaces 112 of the rotor 302 and, thus, substantially reduce wear of the superhard bearing elements 106. When one or more of the bearing surfaces 112 have not been sufficiently worn-in (i.e., smoothed), the thrust loads exceed a certain value, or the rotational speed of the rotor 302 is reduced, the fluid film 310 may not be sufficient to prevent the bearing surfaces 112 of the stator 304 and the bearing surfaces 112 of the rotor 302 from contacting each other.

Under such operational conditions, the thrust-bearing apparatus 300 may not operate as a hydrodynamic bearing, but may allow contact between bearing surfaces 112. Thus, under certain operational conditions (e.g., before wear-in is complete), the thrust-bearing apparatus 300 may be operated so that the bearing surfaces 112 contact each other during use or a partially developed fluid film is present between the bearing surfaces 112 during use. Later, as wear-in progresses, hydrodynamic conditions may develop. The superhard bearing elements 106 are sufficiently wear-resistant to accommodate repetitive contact with each other, such as during start-up and shut-down of a subterranean drilling system employing the thrust-bearing apparatus 300 or other operational conditions not favorable for forming the fluid film 310.

Figure 5B:
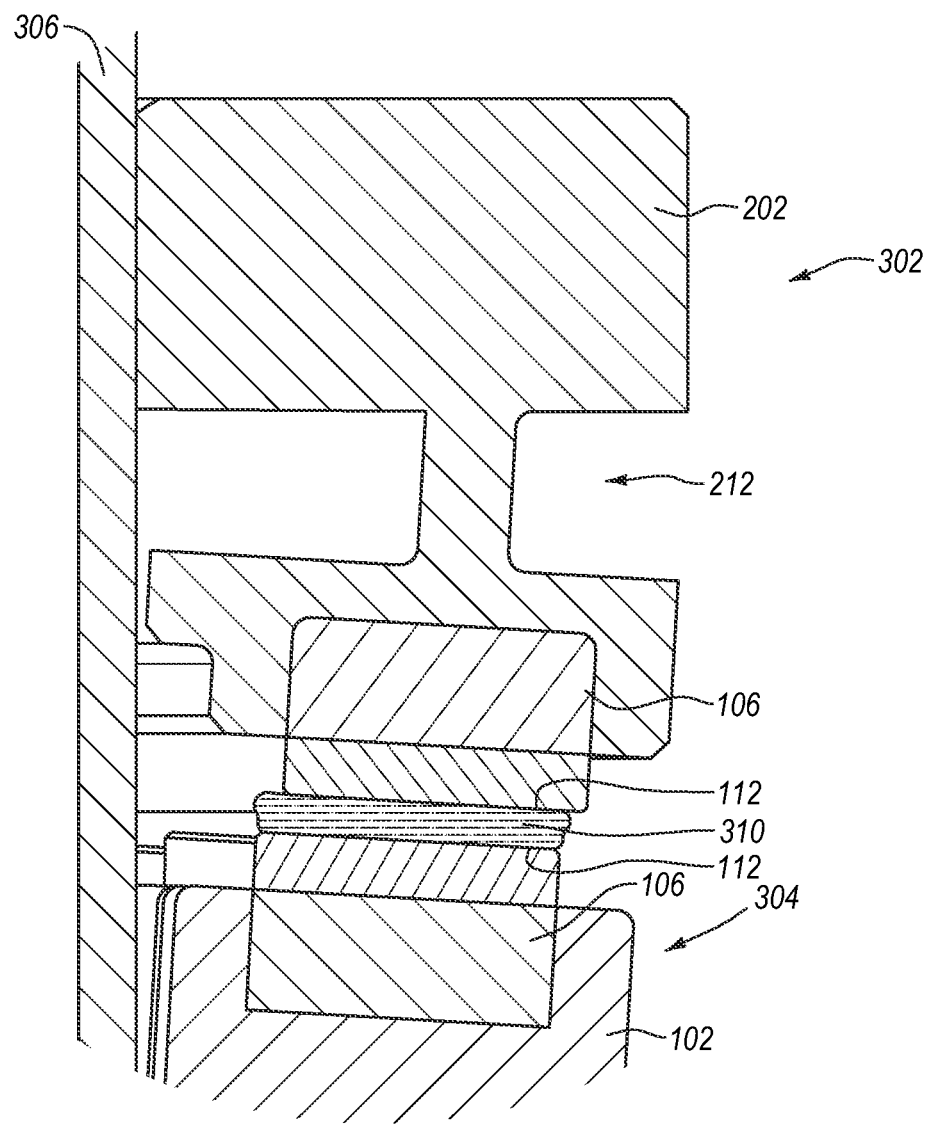
FIG. 5B is an enlarged cross-sectional view of the thrust-bearing apparatus shown in FIG. 5A illustrating how the support ring of the rotor can bend to accommodate minor thermal warping of the support ring of the stator.

FIG. 5B, which is an enlarged side cross-sectional view of FIG. 5A, illustrates how the support ring 202 of the rotor 304 can bend to accommodate minor thermal warping of the support ring 102 of the stator 304. The configuration of the support ring 202 of the rotor 302 enables the support ring 202 to flex so that the bearing surfaces 112 of the rotor 302 remain substantially parallel to the bearing surfaces 112 of the stator 304 during use.

Additional details of such thrust-bearing assemblies and apparatuses may be found in U.S. patent application Ser. No. 12/854,337 filed Aug. 11, 2010 and entitled BEARING ASSEMBLY INCLUDING BEARING SUPPORT RING CONFIGURED TO REDUCE THERMAL WARPING DURING USE, BEARING APPARATUSES USING THE SAME, AND RELATED METHODS, which is hereby incorporated, in its entirety, by this reference.

Figure 6:
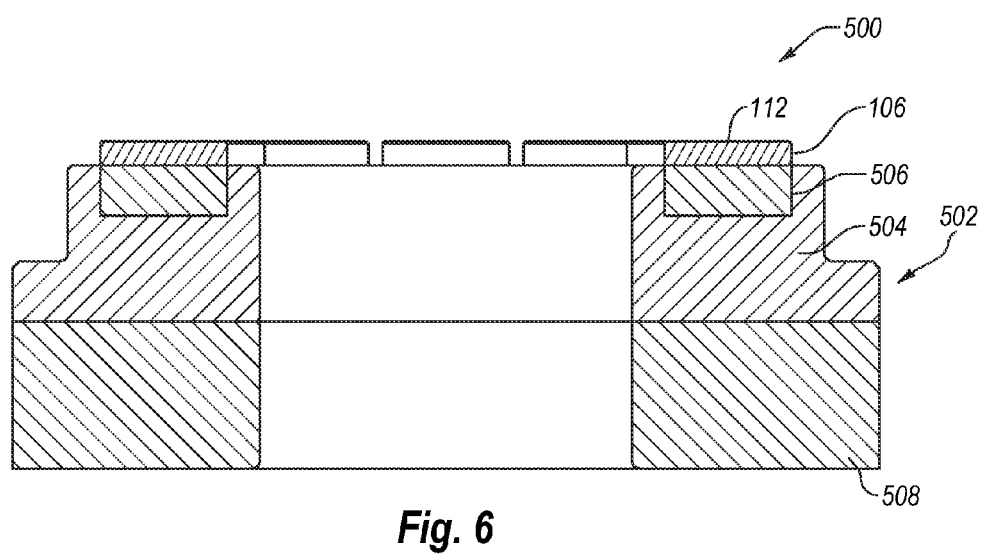
FIG. 6 is a side cross-sectional view of an embodiment a thrust-bearing assembly having a bi-material support ring that is configured to compensate for thermal warping due to a thermal gradient in the bi-material support ring.
Figure 7A:
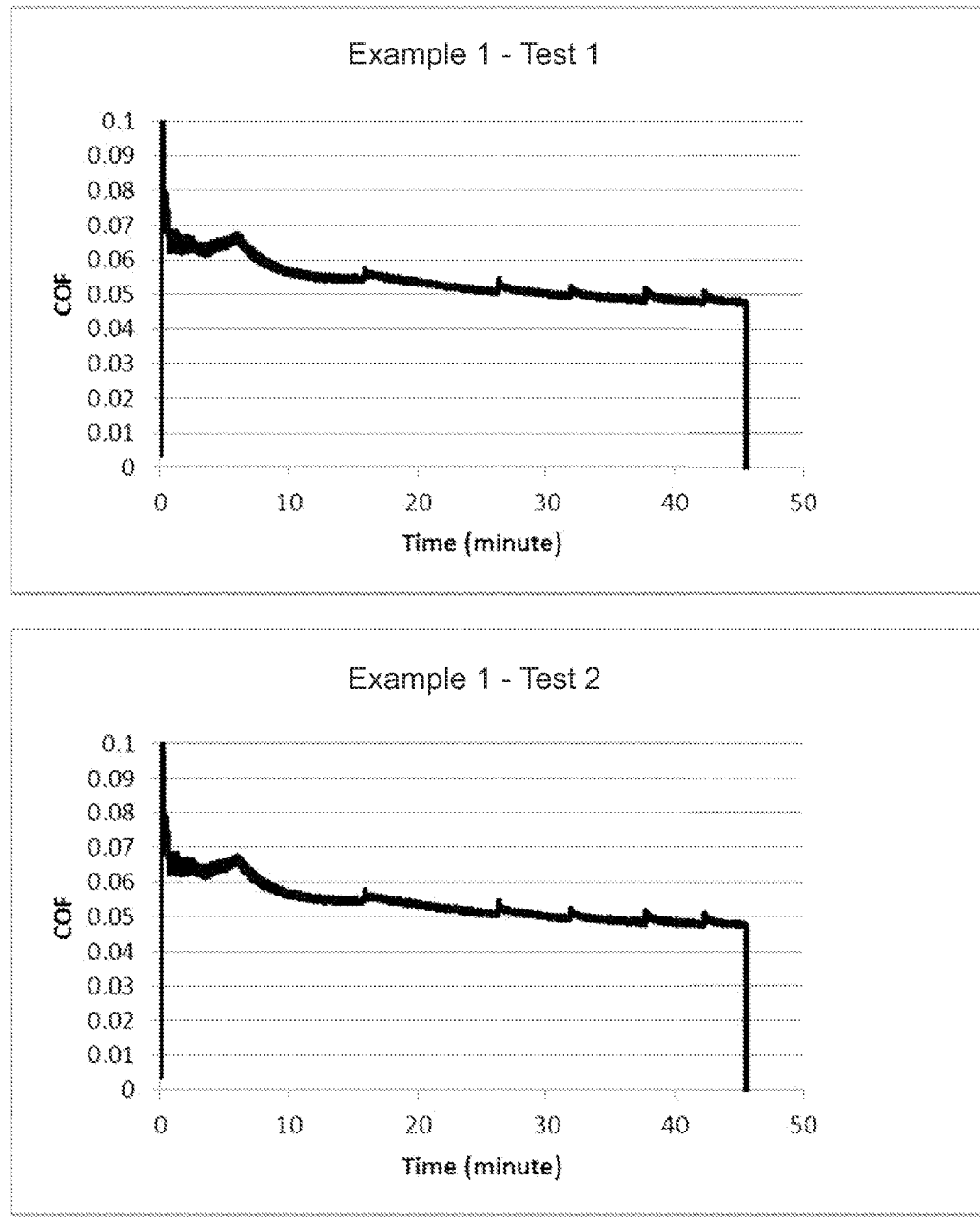
FIG. 7A-7C are graphs charting the COF as a function of time during wear-in of thrust-bearing apparatus Example 1.
Figure 7B:
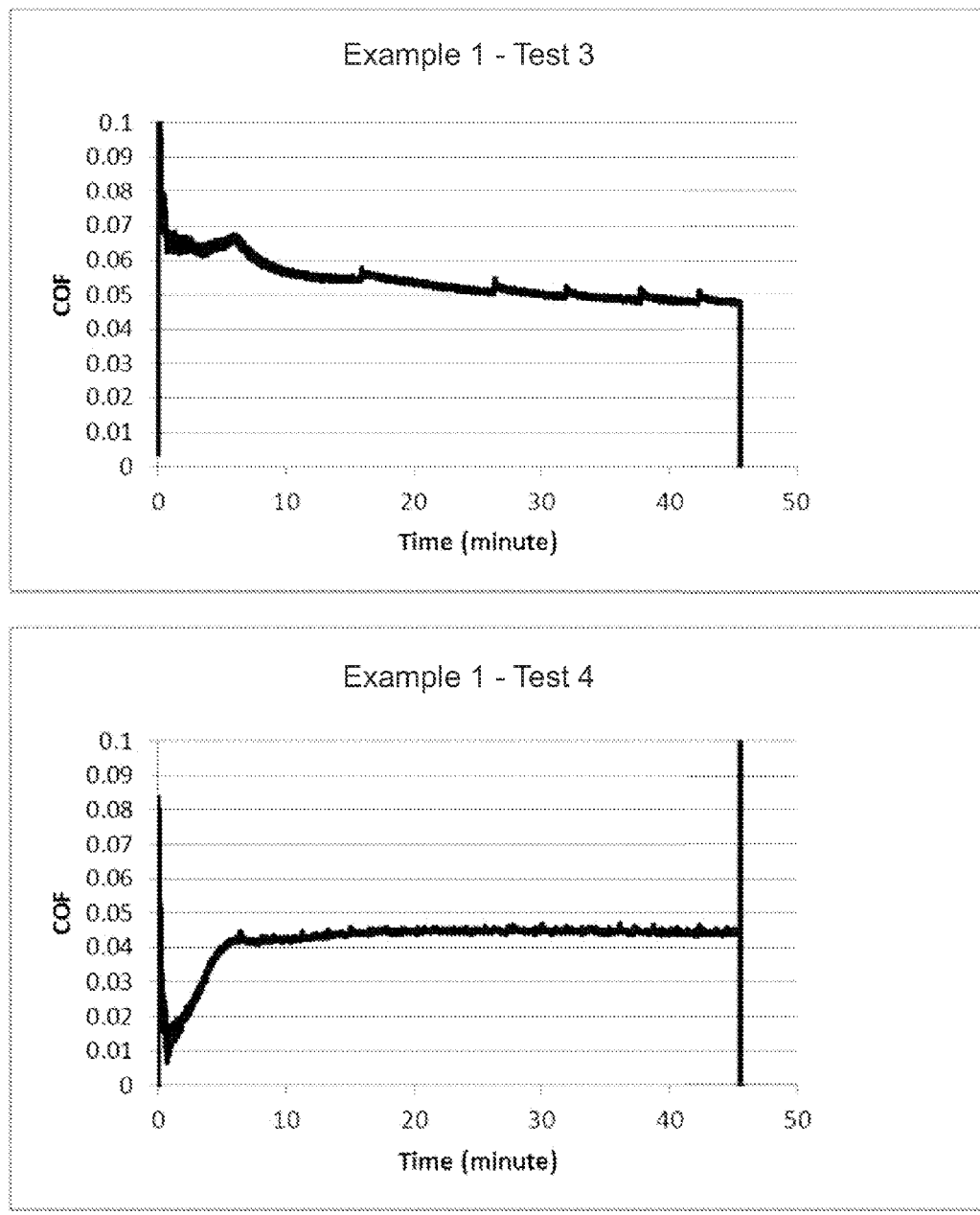
Figure 7C:
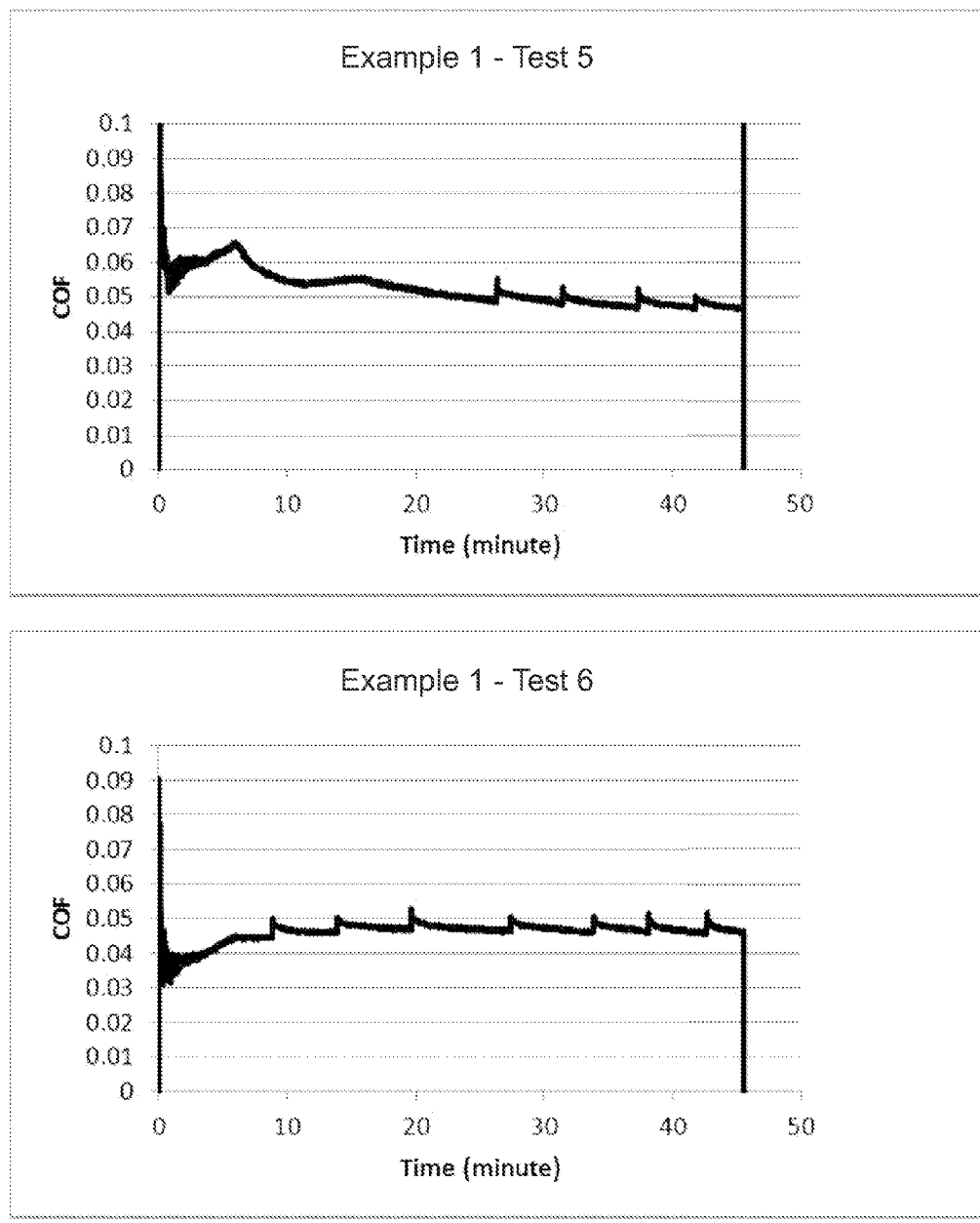

As an alternative to or in addition to the described thermal-warping-reducing features, the support ring may be made from a bi-material structure that is designed to compensate for the thermal expansion mismatch with the superhard bearing elements 106. FIG. 6 is a side cross-sectional view of an embodiment of a thrust-bearing assembly 500 having a bi-material support ring 502 that is configured to compensate for thermal warping due to a temperature gradient in the support ring 502. The thrust-bearing assembly 500 may be used as in combination with the thrust-bearing assembly 200 shown in FIGS. 3A-3D to form a thrust-bearing apparatus. The support ring 502 is configured similarly to the support ring 102 shown in FIGS. 2A-2D so only the differences between the support rings 102 and 502 are discussed in the interest of brevity.

The support ring 502 includes a first ring portion 504 including a plurality of circumferentially-spaced recesses 506, with each recess 506 having one of the superhard bearing elements 106 mounted partially therein. The first ring portion 504 exhibits a first thermal expansion coefficient that is less than that of a second ring portion 508 that is bonded to the first ring portion 504. For example, the first ring portion 504 may comprise an iron-based alloy, such as stainless steel or carbon steel. The second ring portion 508 exhibits a second thermal expansion coefficient that is greater than that of the first thermal expansion coefficient the first ring portion 504. The second ring portion 508 may comprise, for example, a copper alloy, an aluminum alloy, brass, or another suitable material with a thermal expansion coefficient that is greater than that of the first ring portion 504. In an embodiment, the thickness of the first ring portion 504 may be approximately the same as the thickness of the second ring portion 508 (see FIG. 6). In an embodiment, where portions 504 and 508 comprise different materials, the thicknesses may not be the same. For example, the material with the lower modulus of elasticity may be thicker than the material with the higher modulus of elasticity. For example, the thickness of second ring portion 508 may be greater than that of first ring portion 504 where the portions are made of different materials and the material of portion 508 has a lower modulus of elasticity than that of portion 504.

When the thrust-bearing assembly 500 is exposed to operational temperature conditions, the second ring portion 508 induces a thermally-induced radial moment that counters the thermally-induced radial moment due to the thermal gradient in the support ring 502 so that the bearing surfaces 112 are displaced out of plane (if at all) about the same extent or less than in the thrust-bearing assembly 100. Accordingly, the second ring portion 508 is configured with a thickness and a coefficient of thermal expansion so that the thermally-induced radial moment counters the thermally-induced radial moment due to a temperature gradient in the support ring 502. Thus, the second ring portion 508 functions as a thermal-warping-reducing feature.

During wear-in, the rotor may be rotated at least about 60 RPM (e.g., at least about 200 RPM). The thrust load may be at least about 5,000 pounds (e.g., at least about 10,000 pounds, about 5,000 pounds to about 10,000 pounds), and the time to wear in may be less than about 3 hours, about 2 hours or less, about 1 hour or less, or about 1 hour to about 3 hours. Wear-in may be accomplished at the manufacturer or by the end user, as desired.

Testing was performed to measure the wear-in time for the bearing surfaces of the thrust-bearing apparatuses configured in accordance with various embodiments of the invention. The wear-in time is the time at which the bearing surfaces of the rotor and stator of the thrust-bearing apparatus are uniformly worn to a desired smoothness (e.g., less than about 5 microinch Ra).

The bearing elements of the thrust-bearing apparatuses tested were PDCs having approximately a 0.528 inch diameter and an unleached polycrystalline diamond table. During the testing, the rotor was rotated at about 400 RPM and the thrust load was ramped up to about 25,000 pounds in about 15 minutes. The lubricating fluid used was Paratherm MR, a heat transfer linear alkene mineral oil. The thrust load of about 25,000 pounds was maintained for about 30 minutes, after which the bearing surfaces were examined visually to determine how the bearing surfaces had worn. After examination of the bearing surfaces, the loading and visual inspection was repeated, as previously described, until the bearing surfaces were uniformly worn-in.

Table I below lists the configurations of the thrust-bearing apparatuses tested. "Nonconforming" means that the stator or rotor lacked radially-extending slots 116 as shown in the thrust-bearing assembly 100 of FIGS. 2A-2D and lacked a circumferentially-extending recess 212 as shown in FIGS. 3A-3D. In Table I below, when the stator or rotor configuration recites "conforming," it means that the support ring included a circumferentially-extending recess similar to the circumferentially-extending recess 212 of the thrust-bearing assembly 200 shown in FIGS. 3A-3D. In Table I below, when the stator or rotor configuration recites "slots," it means that the support ring included radially-extending slots between circumferentially adjacent PDCs similar to the radially-extending slots 116 shown in the thrust-bearing assembly 100 of FIGS. 2A-2D. In Table I below, when the stator or rotor configuration recites "slots and conforming," it means that the support ring included radially-extending slots between circumferentially adjacent PDCs similar to the radially-extending slots 116 shown in the thrust-bearing assembly 100 of FIGS. 2A-2D and that the support ring also included a circumferentially-extending recess similar to the circumferentially-extending recess 212 of the thrust-bearing assembly 200 shown in FIGS. 3A-3D.

TABLE I

Wear-in-Times for Various Thrust-Bearing Apparatus Embodiments

| Thrust-Bearing Apparatus Example No. | Stator Configuration | Rotor Configuration | Wear-in Time (hours) | Final COF |
|---|---|---|---|---|
| 1 | nonconforming | nonconforming | 4 | 0.04 |
| 2 | conforming | conforming | 2 | 0.045 |
| 3 | conforming | nonconforming | 3 | 0.045 |
| 4 | nonconforming | conforming | 1.5 | 0.05 |
| 5 | slots | slots | 1.5 | 0.05 |
| 6 | conforming | slots | 4 | 0.045 |
| 7 | slots | conforming | 2 | 0.055 |
| 8 | nonconforming | slots | 3.5 | 0.045 |
| 9 | slots | nonconforming | 2 | 0.05 |
| 10 | slots and conforming | nonconforming | 1.5 | 0.055 |
| 11 | slots and conforming | slots | 1 | 0.055 |
| 12 | slots and conforming | conforming | 1 | 0.05 |

As shown in the test data of Table I, most of the thrust-bearing apparatuses including at least one thrust-bearing assembly including a feature for reducing thermal warping exhibited a wear-in time that was significantly less than the control (Example 1). Thrust-bearing apparatus Examples 11 and 12 had the lowest wear-in time. Each of Examples 2 through 5 and 7 through 12 exhibit good hydrodynamic or near hydrodynamic performance characteristics and the reduced wear associated with such performance, and with wear-in times that are significantly shorter than Example 1 (the control). Example 6 exhibits a wear-in time approximately equal to that of the control. Although the reasons for this may not be completely understood, it is currently believed that this may be a result of the particular configuration of the stator and rotor in Example 6. For example, the use of a slot configuration on the rotor may provide a minimal benefit (e.g., compare Example 8), while the use of a conforming configuration on the stator may also provide a minimal benefit (compare Example 3).

Although no "slots and conforming" configurations were tested on the rotor because of limitations of the test set up (i.e., the way the assemblies were clamped together), a slotted and conforming configuration may be used on rotors.

FIGS. 7A-18 record the testing results associated with each of Examples 1-12. Each Example began with a 15 minute ramp-up cycle in which the applied load was gradually increased from 1,500 pounds at the start to 25,000 pounds at 15 minutes. Each Example was allowed to wear-in for an additional 30 minutes (45 minutes total), after which the load was removed and the faces of the bearing surfaces were inspected. It was observed that the bearing surfaces became polished radially outwardly beginning from the center of the bearing element. Once the polished portion reached 95% of the radial width of the bearing surface of each bearing element, the Example was deemed "worn-in." If the bearing surfaces were not adequately polished at the end of the 45 minute cycle (i.e., 15 minute ramp-up and 30 minute run) then the 45 minute cycle was repeated until the example had worn-in. For example, Example 1-Test 1 refers to the first wear-in procedure and Example 1-Test 2 refers to the repeated second wear-in procedure.

Figure 8A:
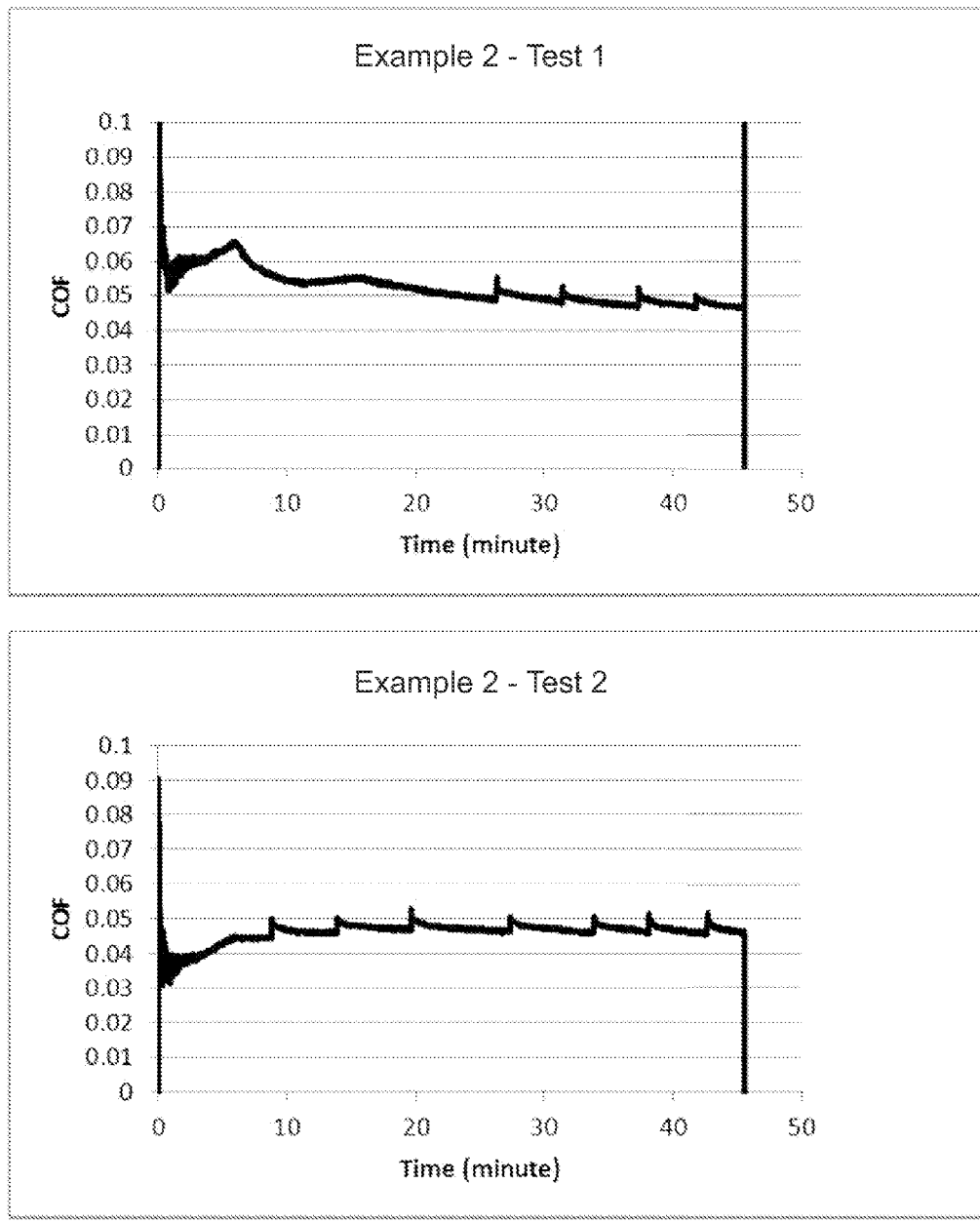
FIGS. 8A and 8B are graphs charting the COF as a function of time of time during wear-in of thrust-bearing apparatus Example 2.
Figure 8B:
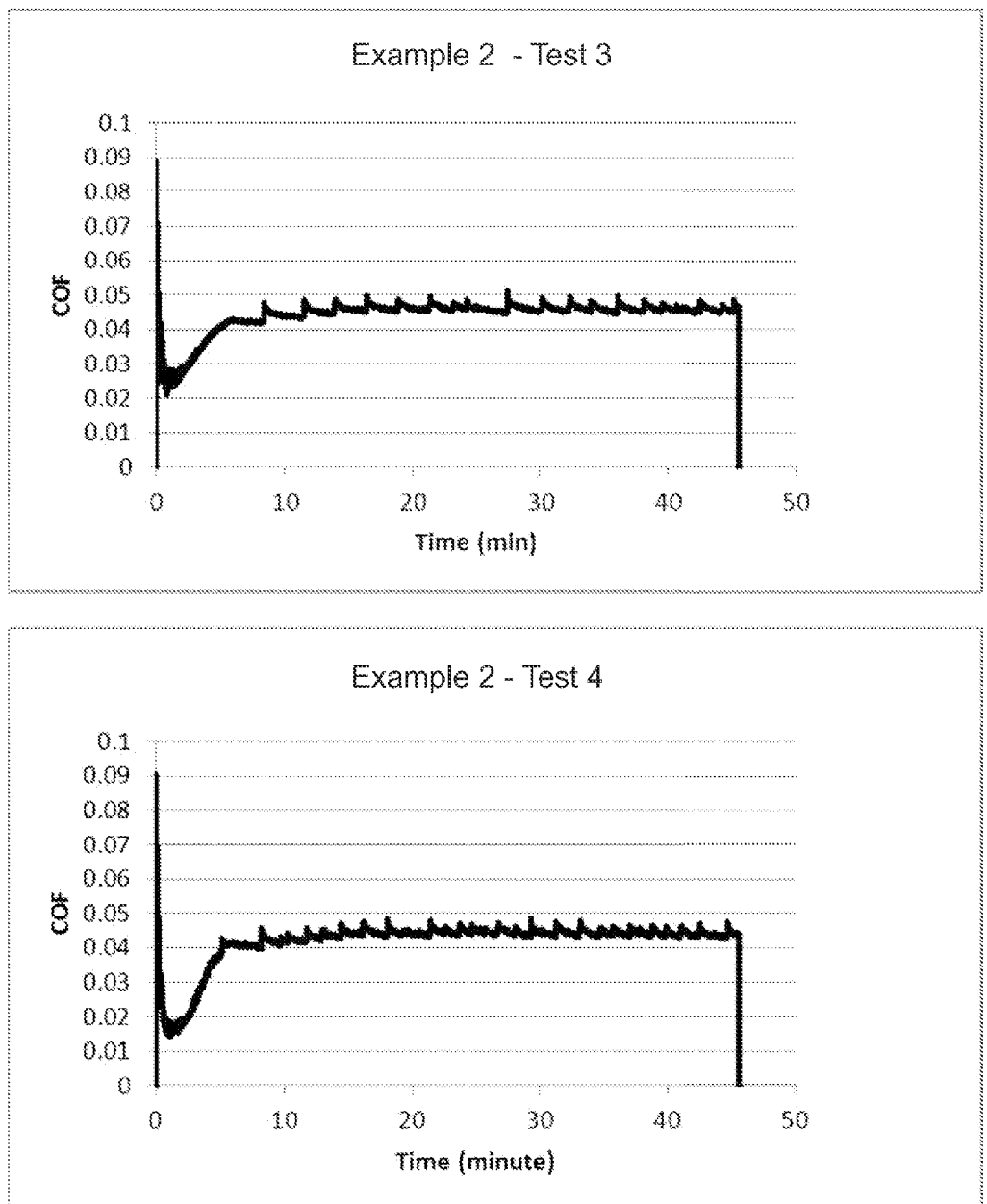
Figure 9A:
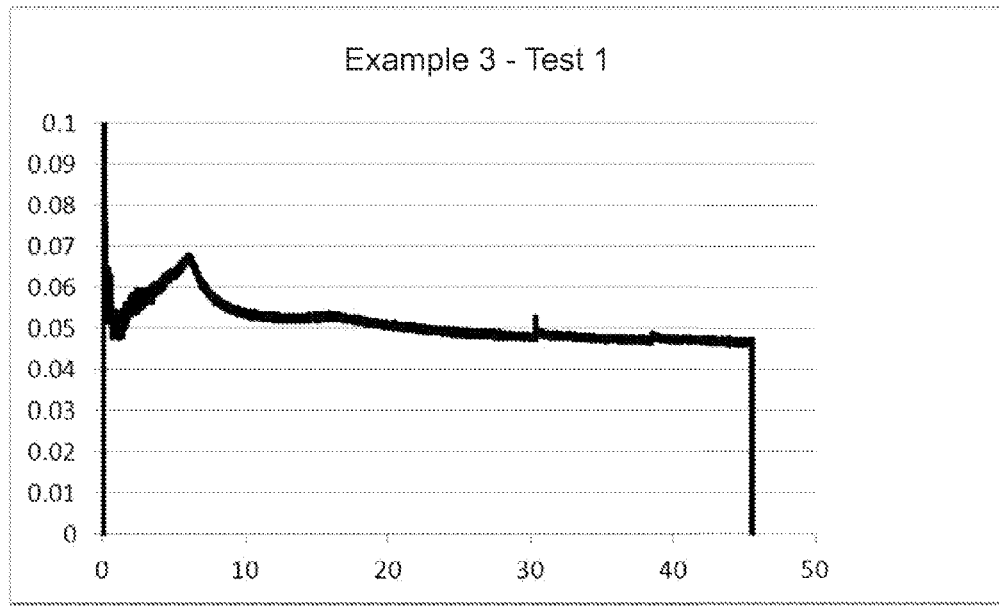
FIG. 9A-9C are graphs charting the COF as a function of time during wear-in of thrust bearing apparatus Example 3.
Figure 9A:
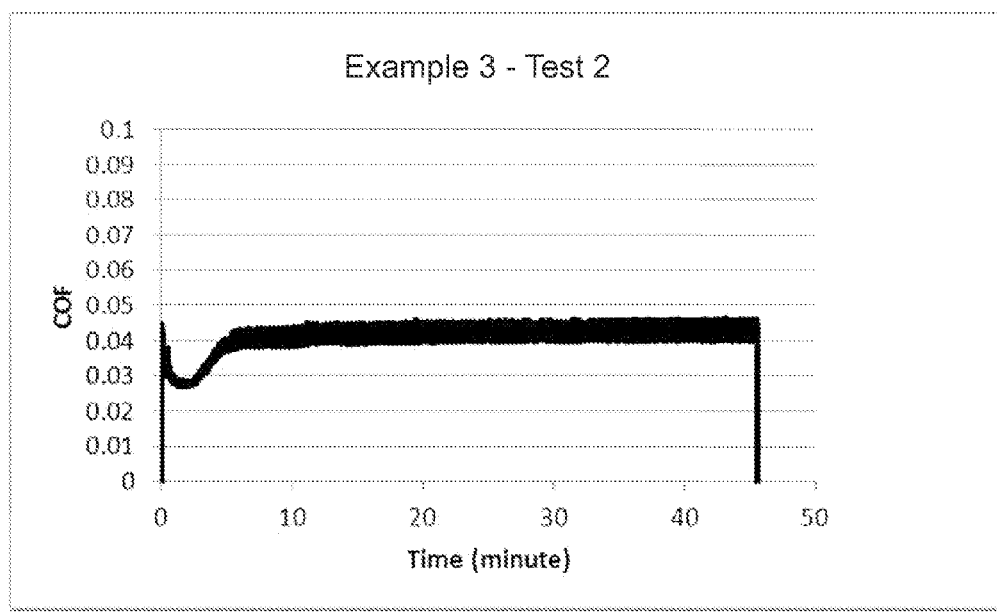
Figure 9B:
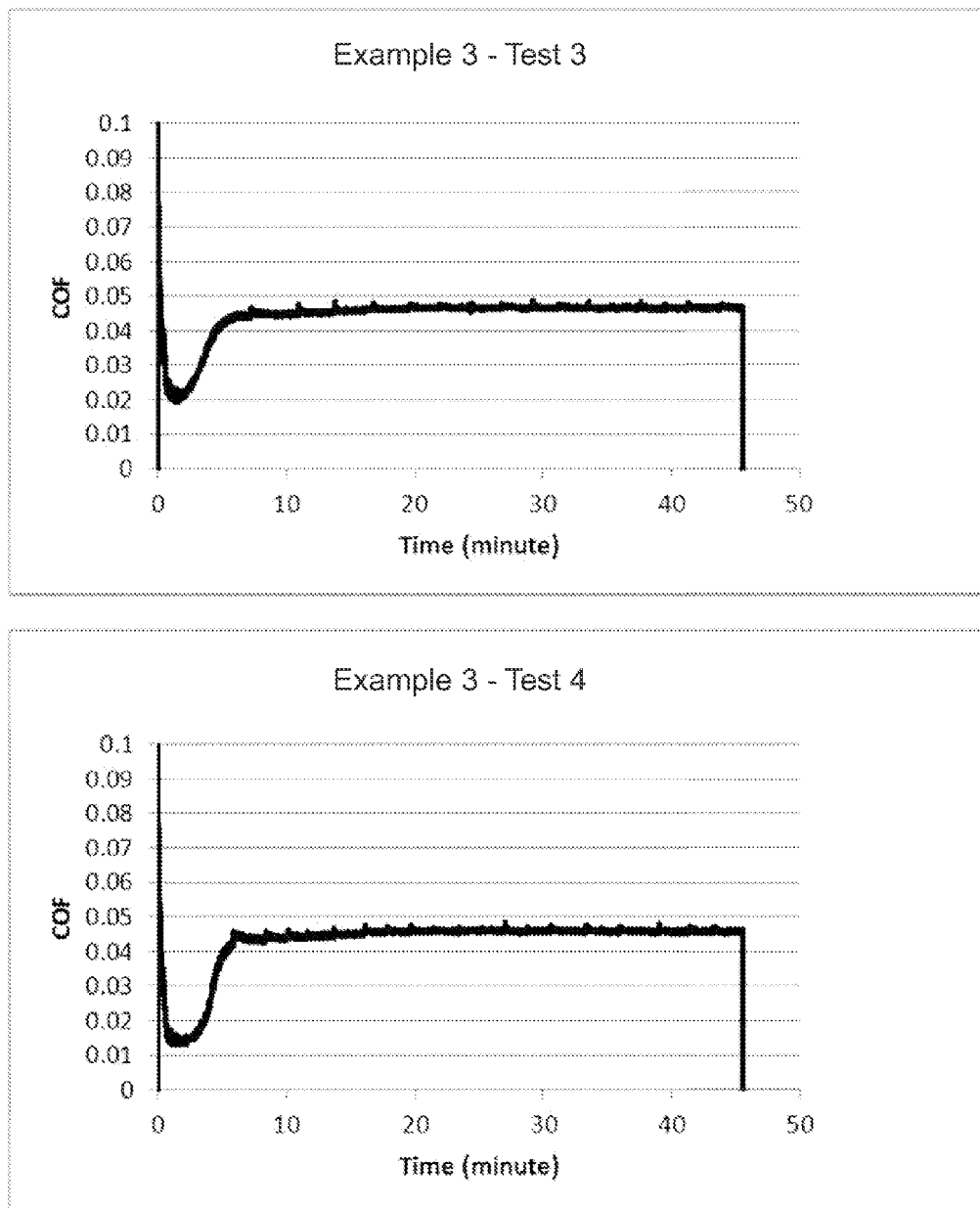
Figure 9C:
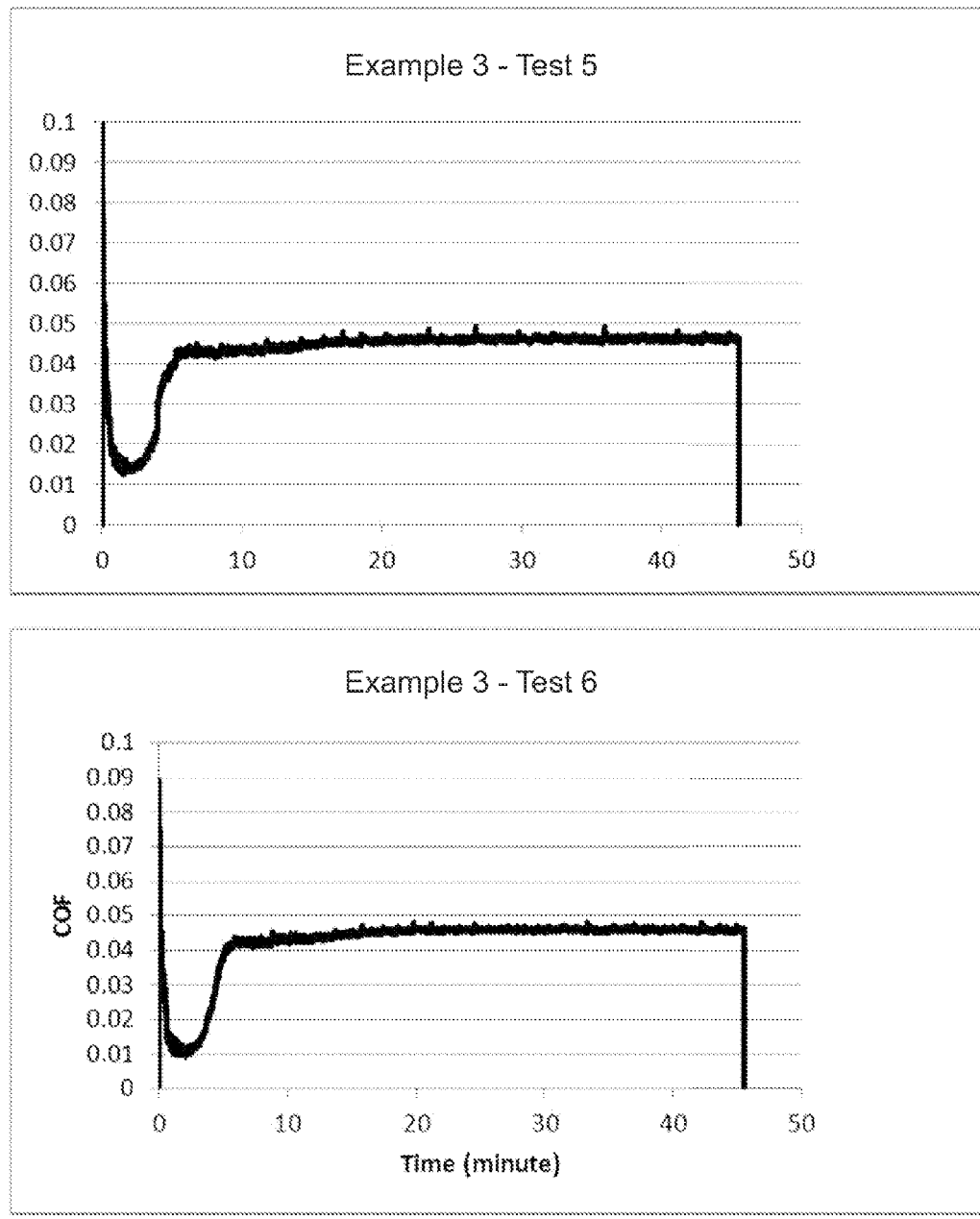
Figure 10A:
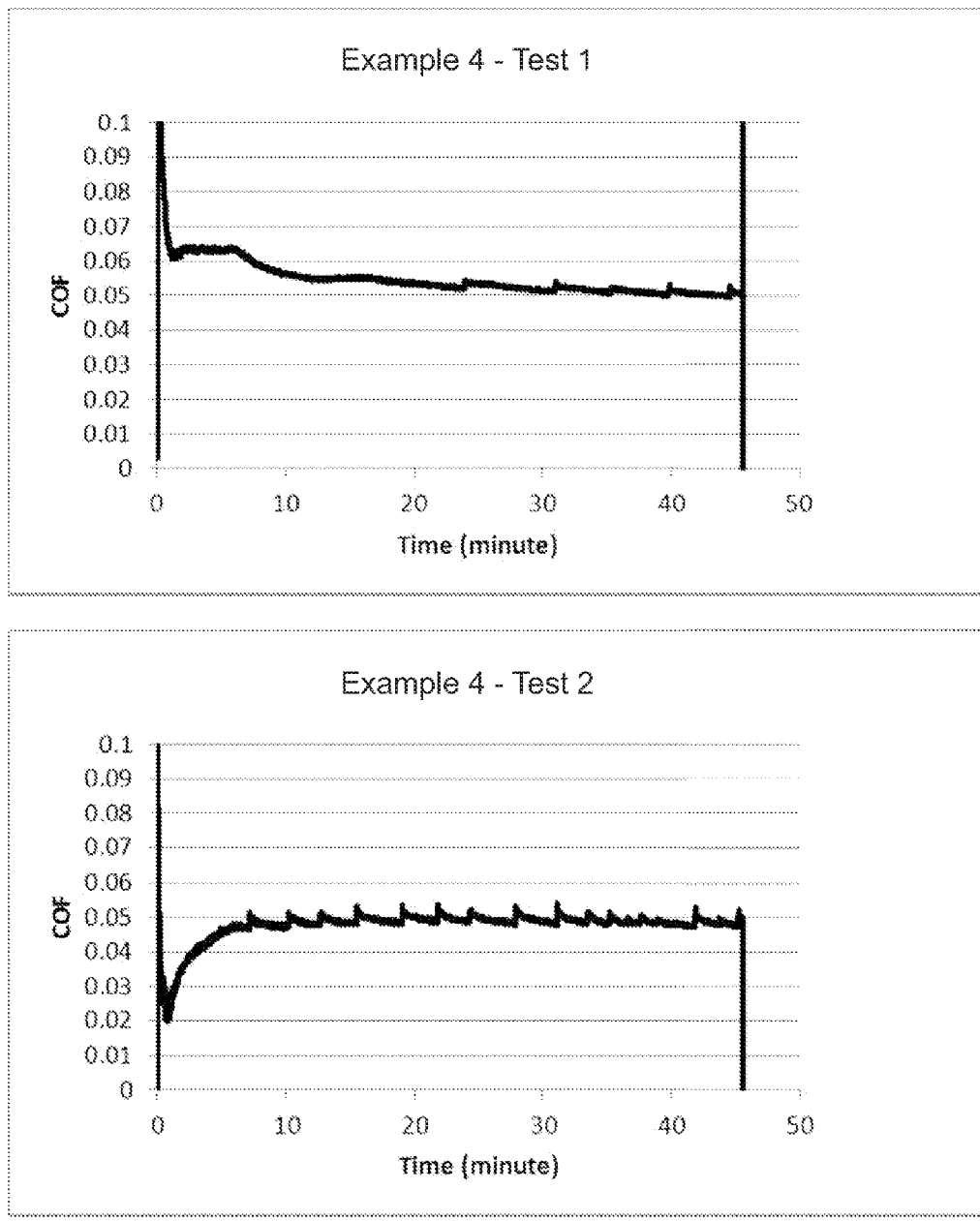
FIGS. 10A and 10B are graphs charting the COF as a function of time during wear-in of thrust bearing apparatus Example 4.
Figure 10B:
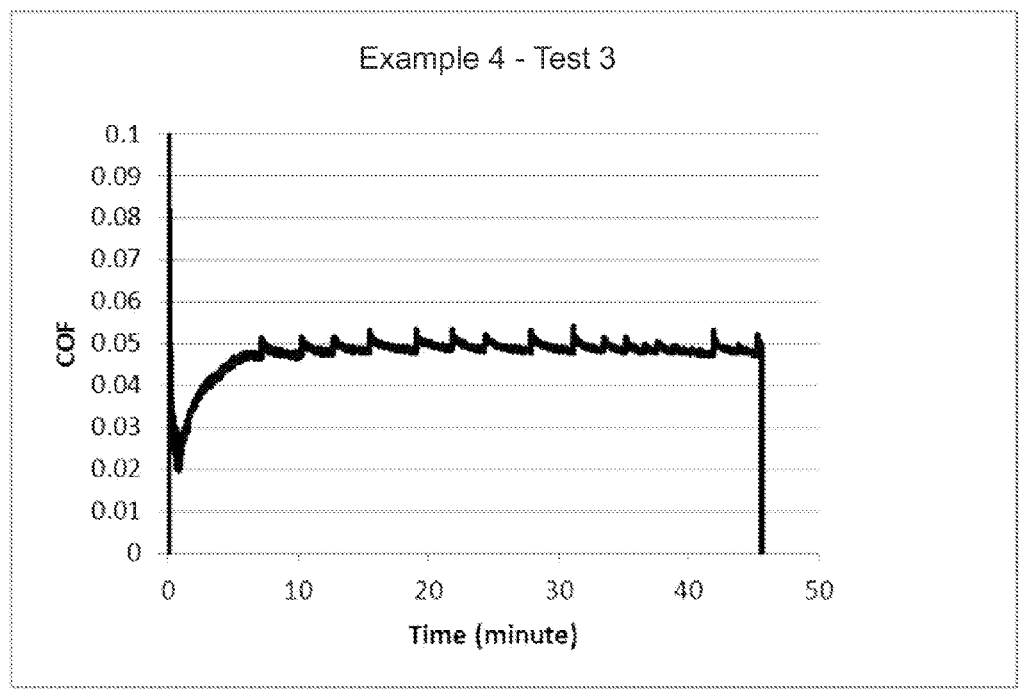
Figure 11A:
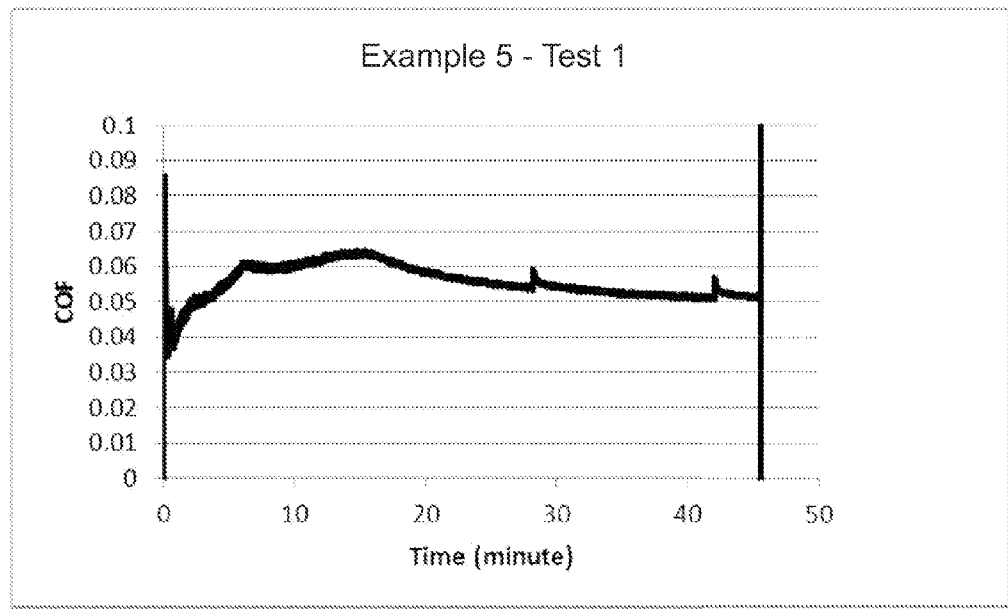
FIGS. 11A and 11B are graphs charting the COF as a function of time during wear-in of thrust bearing apparatus Example 5.
Figure 11A:
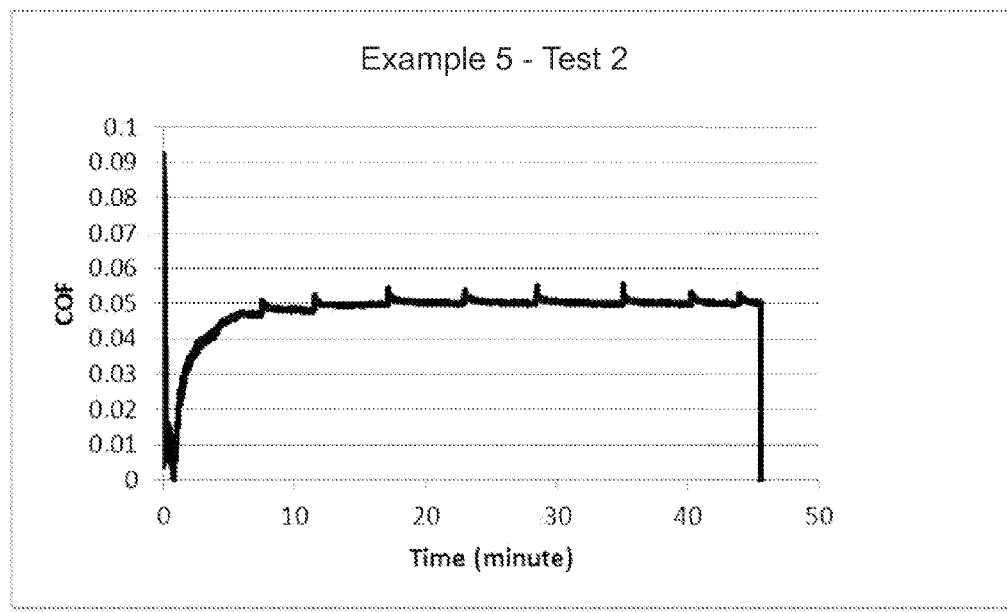
Figure 11B:
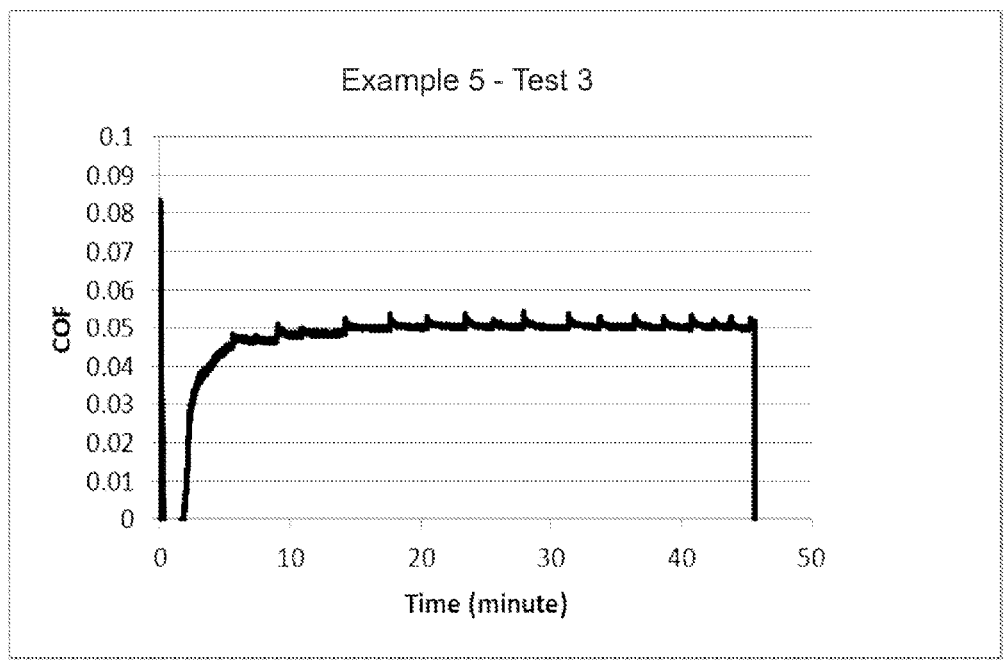
Figure 12A:
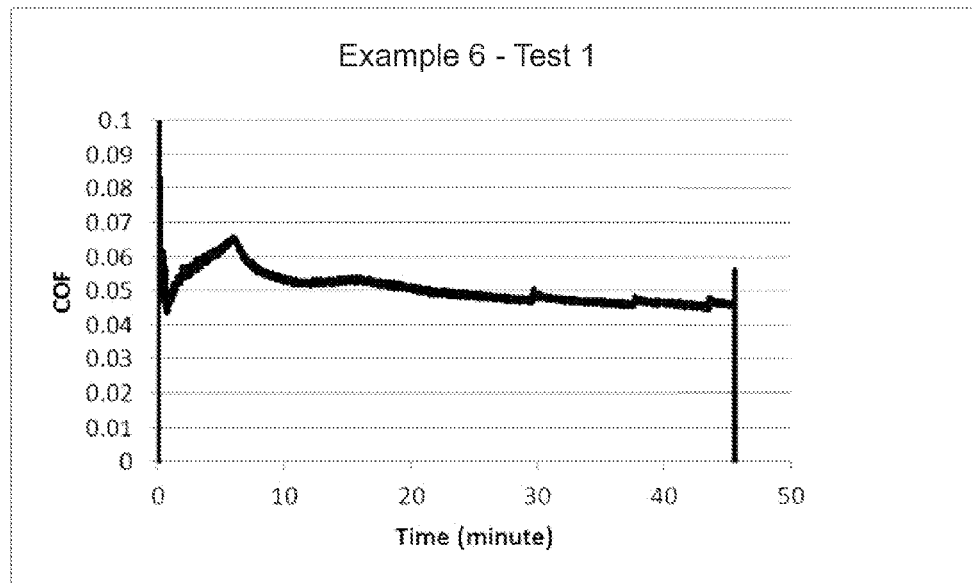
FIG. 12A-12D are graphs charting the COF as a function of time during wear-in of thrust bearing apparatus Example 6.
Figure 12A:
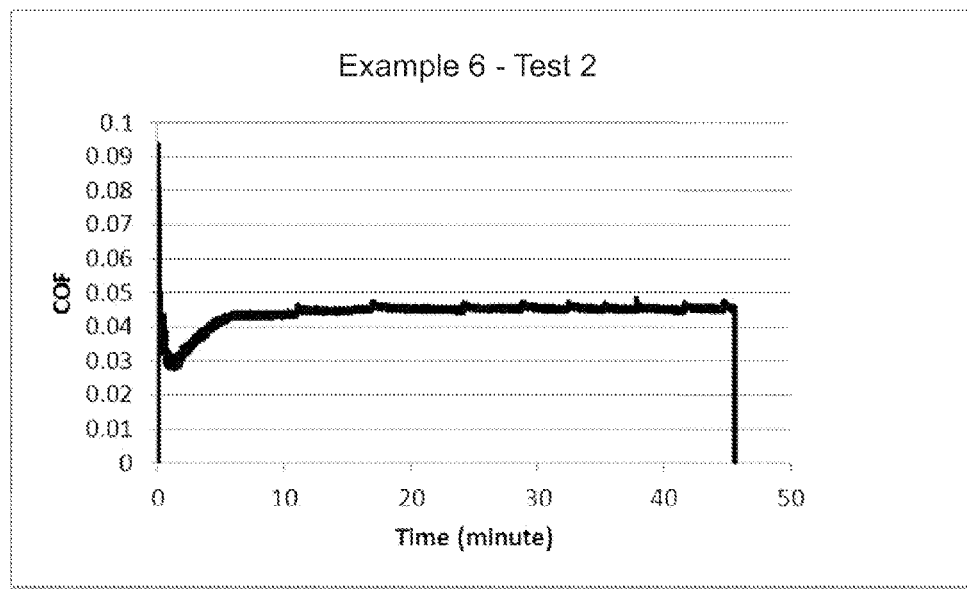
Figure 12B:
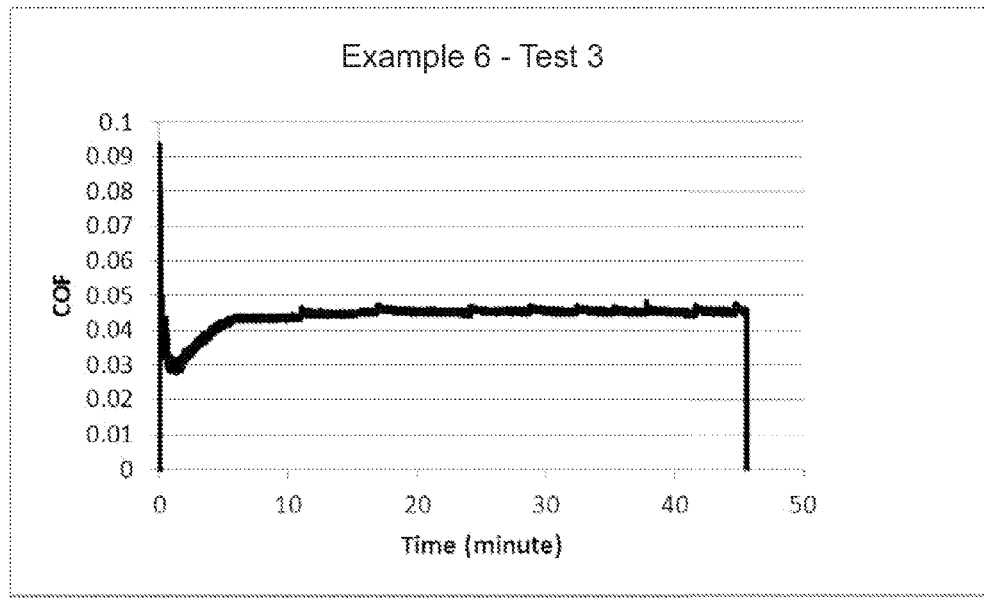
Figure 12B:
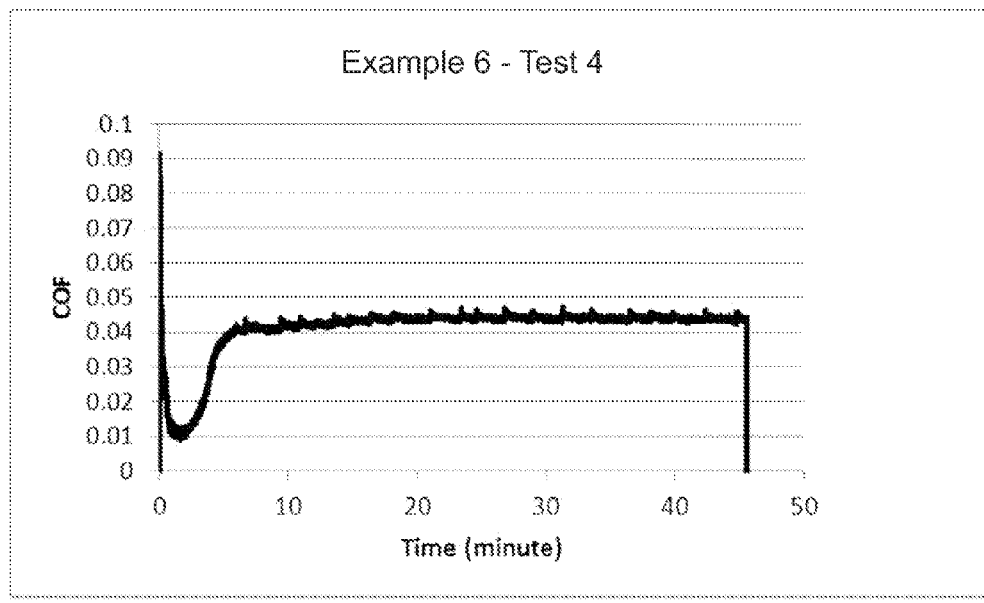
Figure 12C:
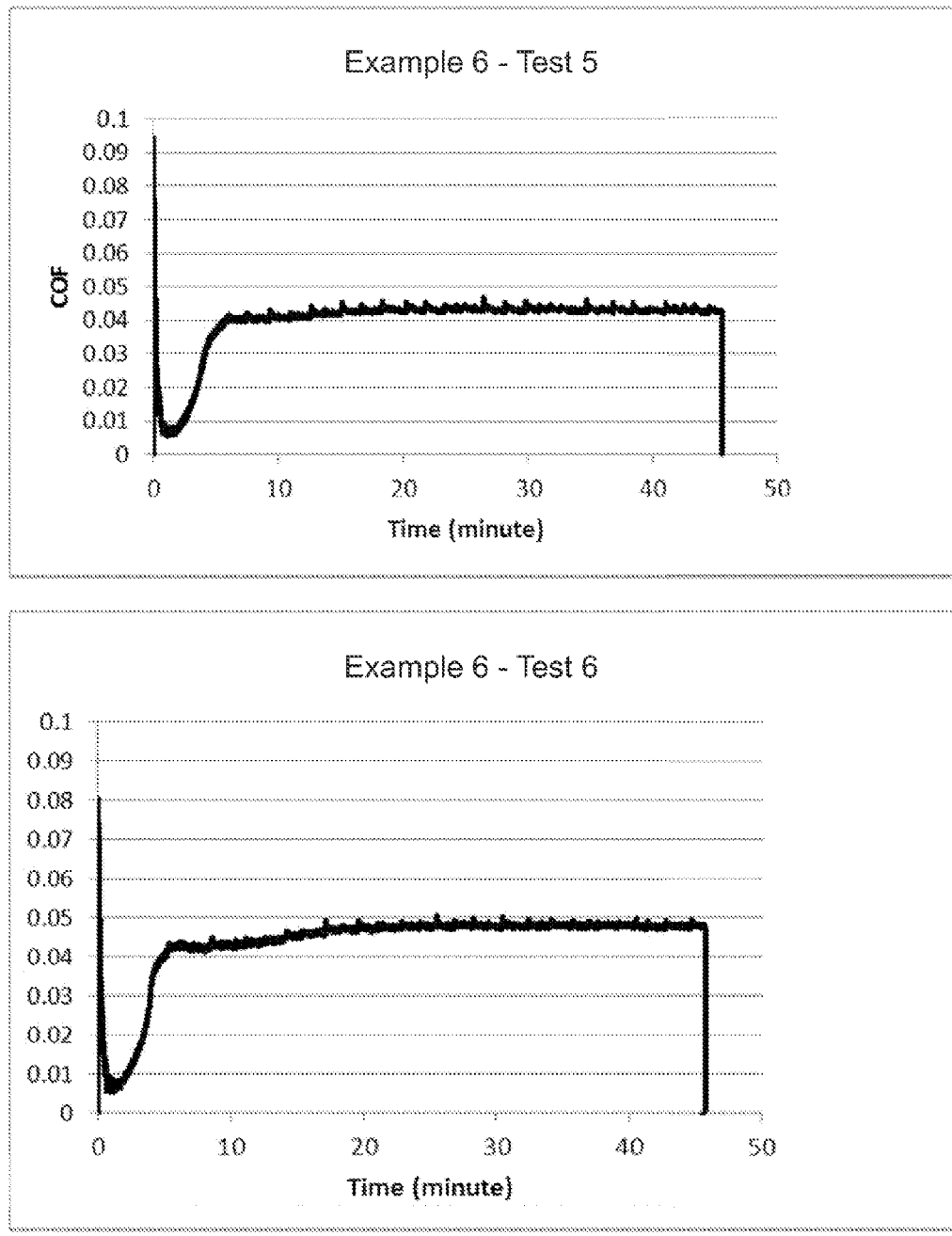
Figure 12D:
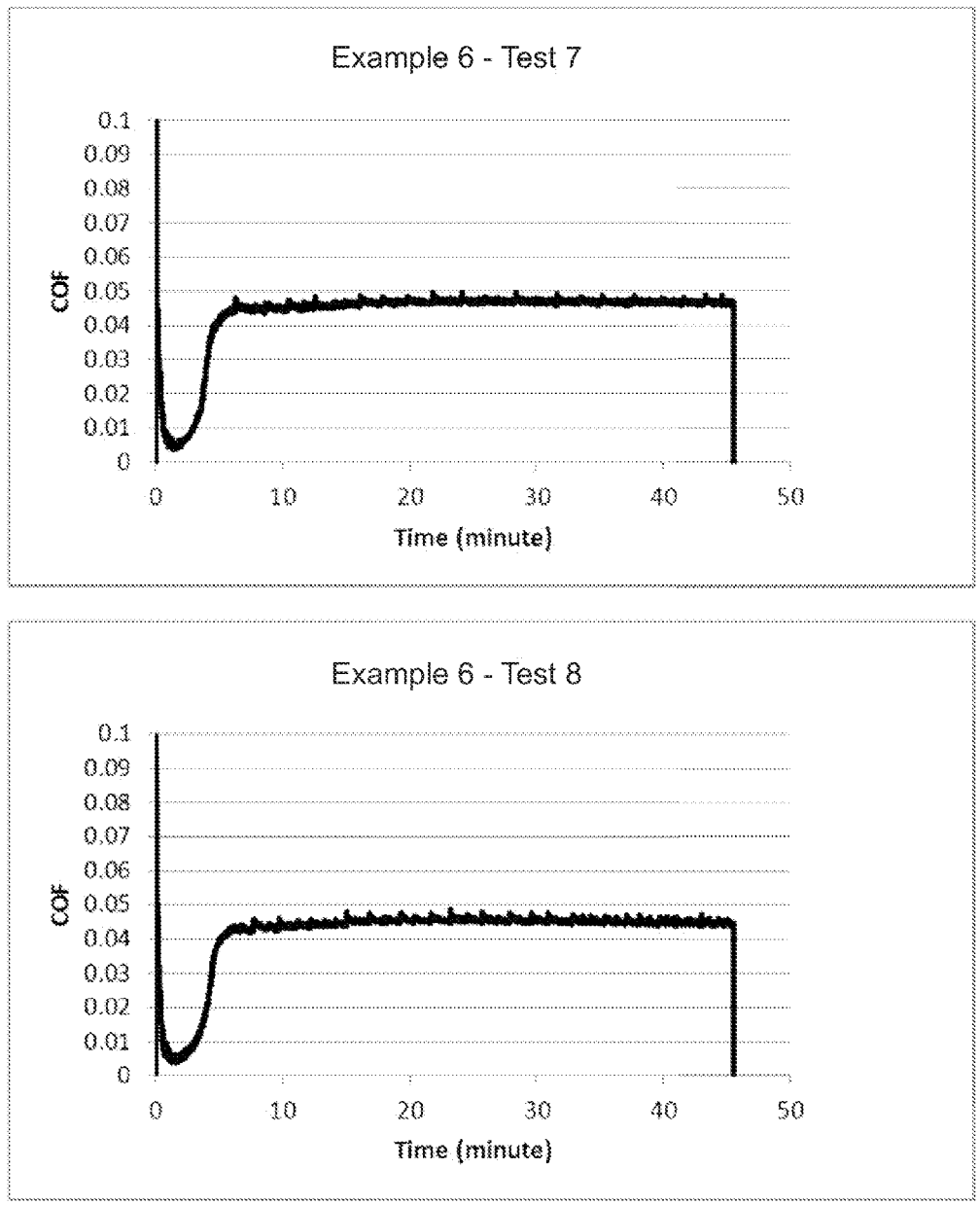
Figure 13A:
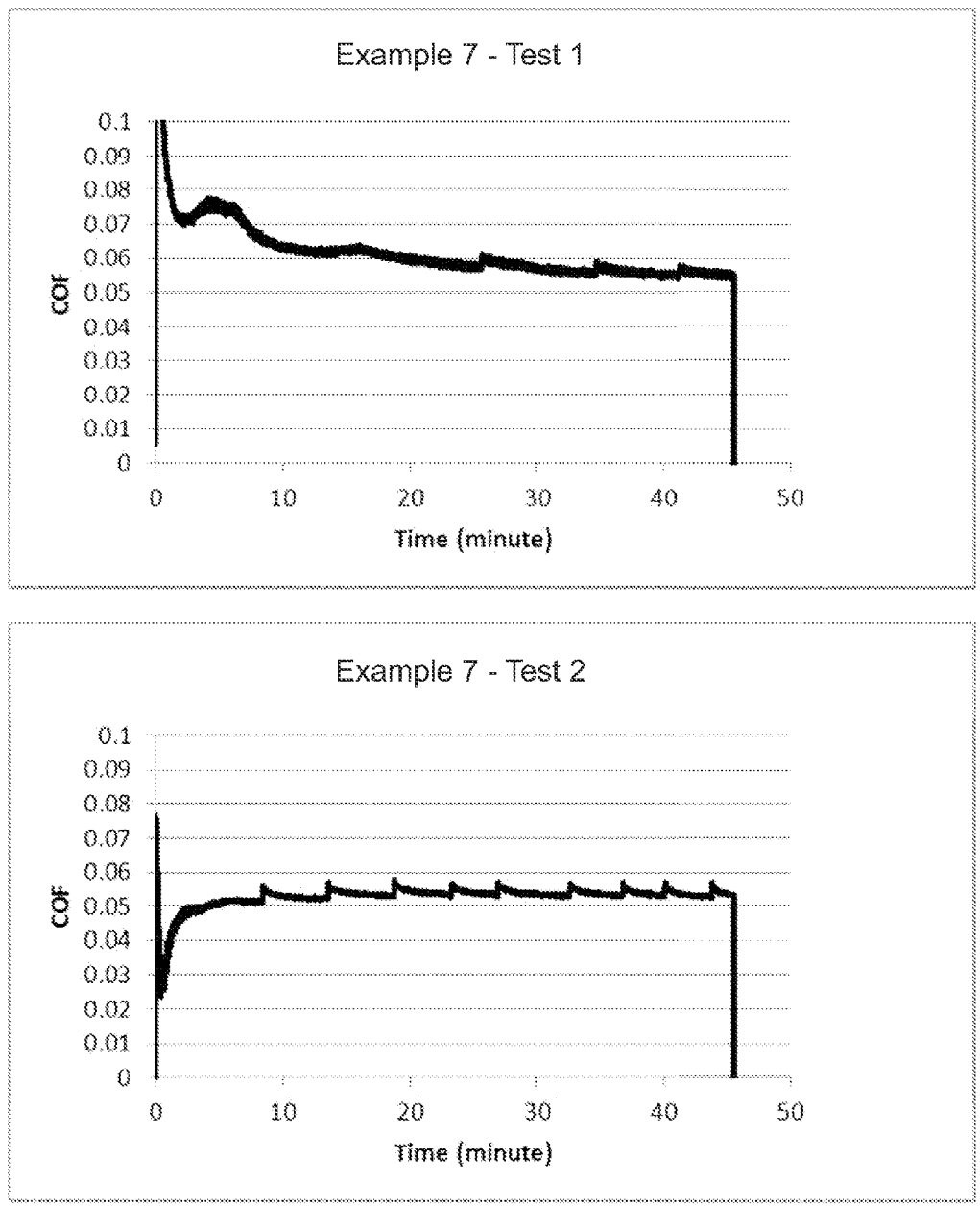
FIGS. 13A and 13B are graphs charting the COF as a function of time during wear-in of thrust bearing apparatus Example 7.
Figure 13B:
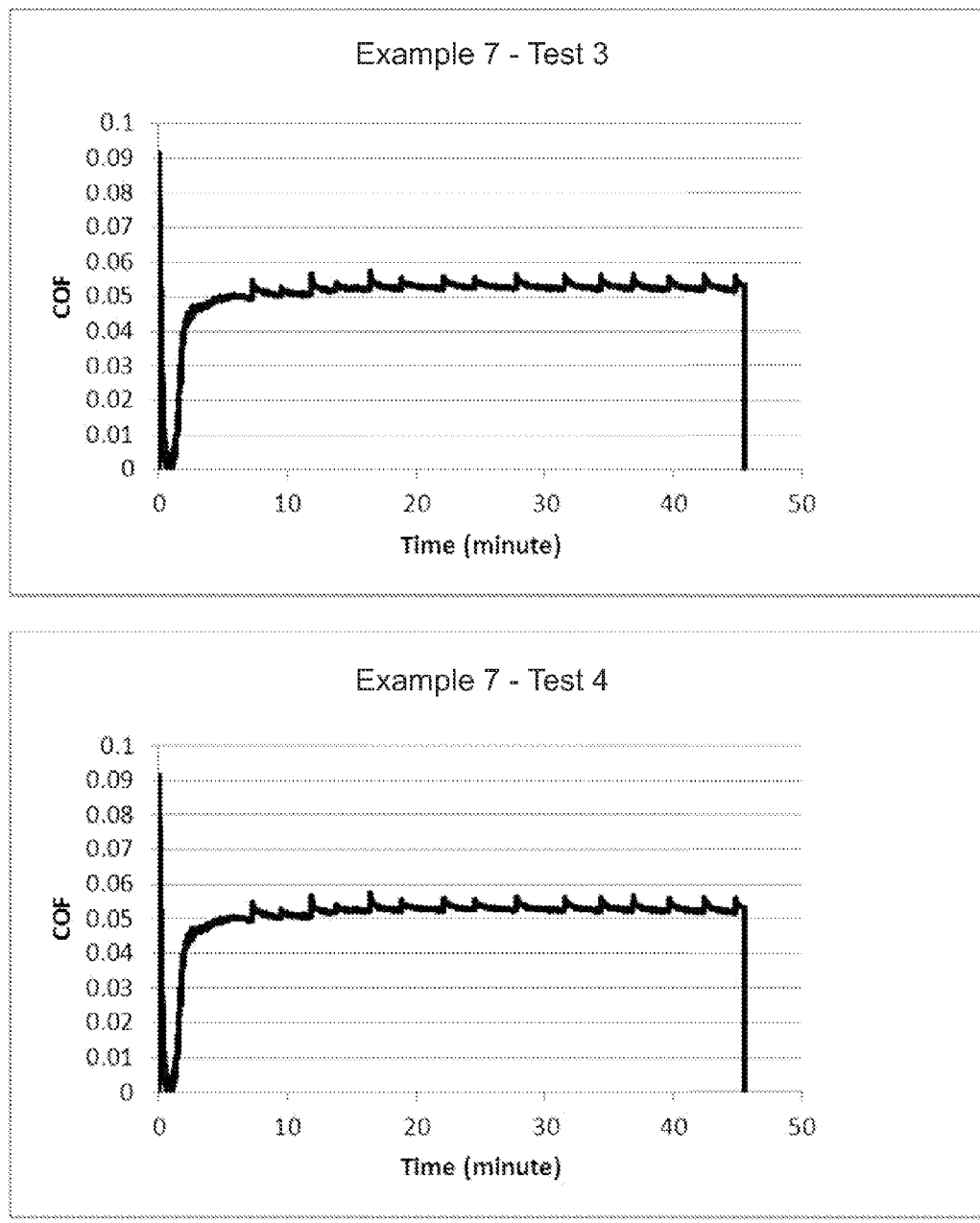
Figure 14A:
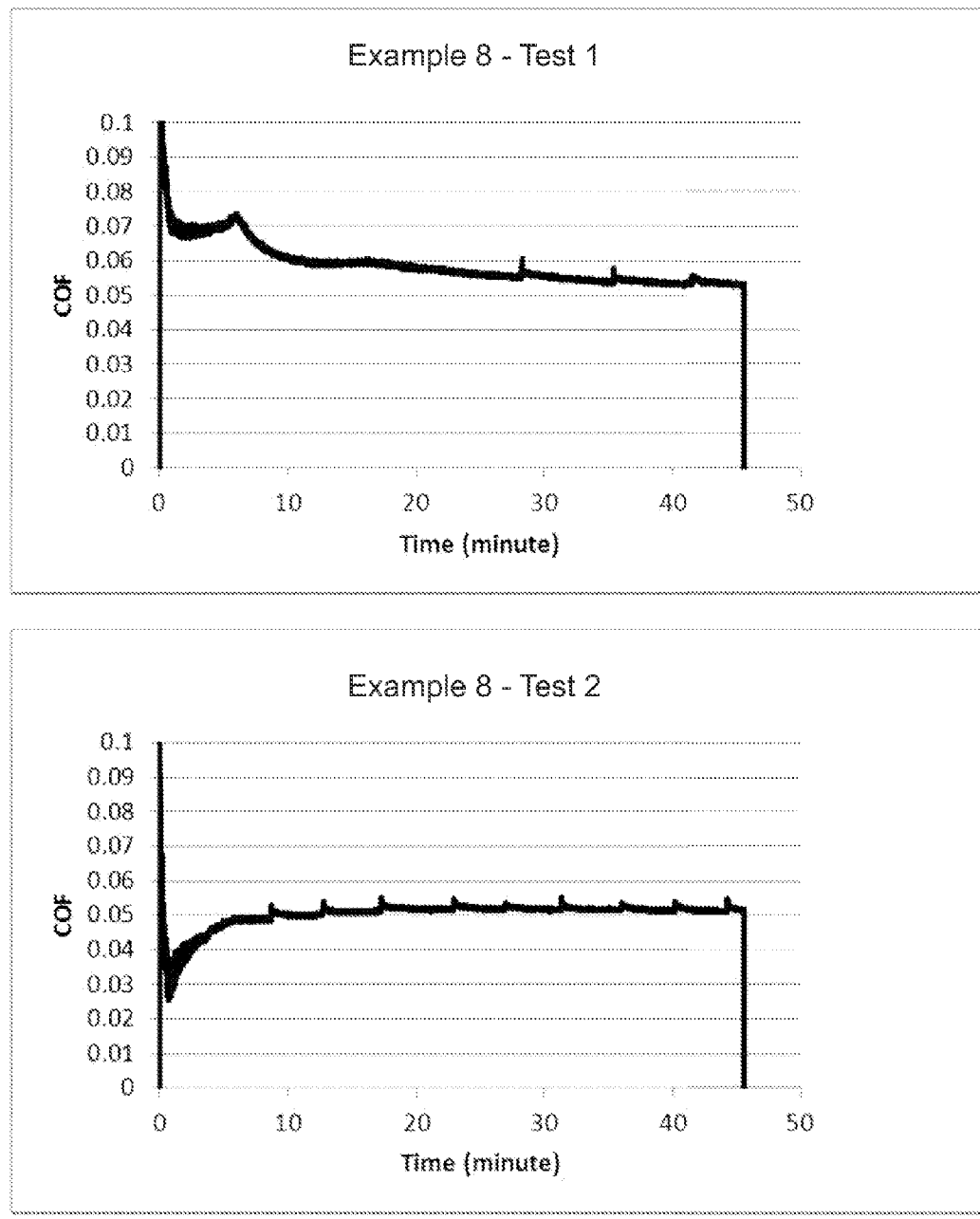
FIG. 14A-14D are graphs charting the COF as a function of time during wear-in of thrust bearing apparatus Example 8.
Figure 14B:
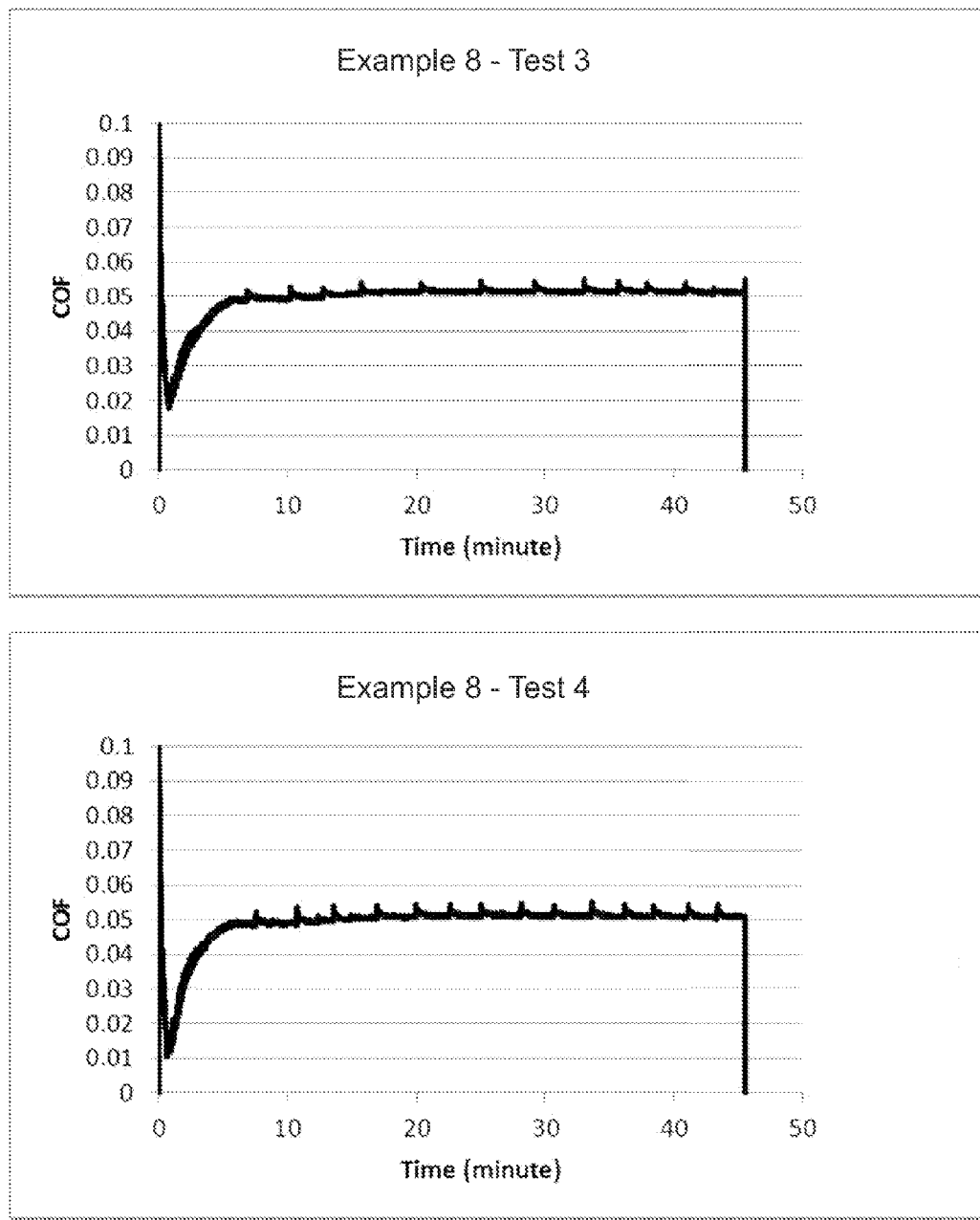
Figure 14C:
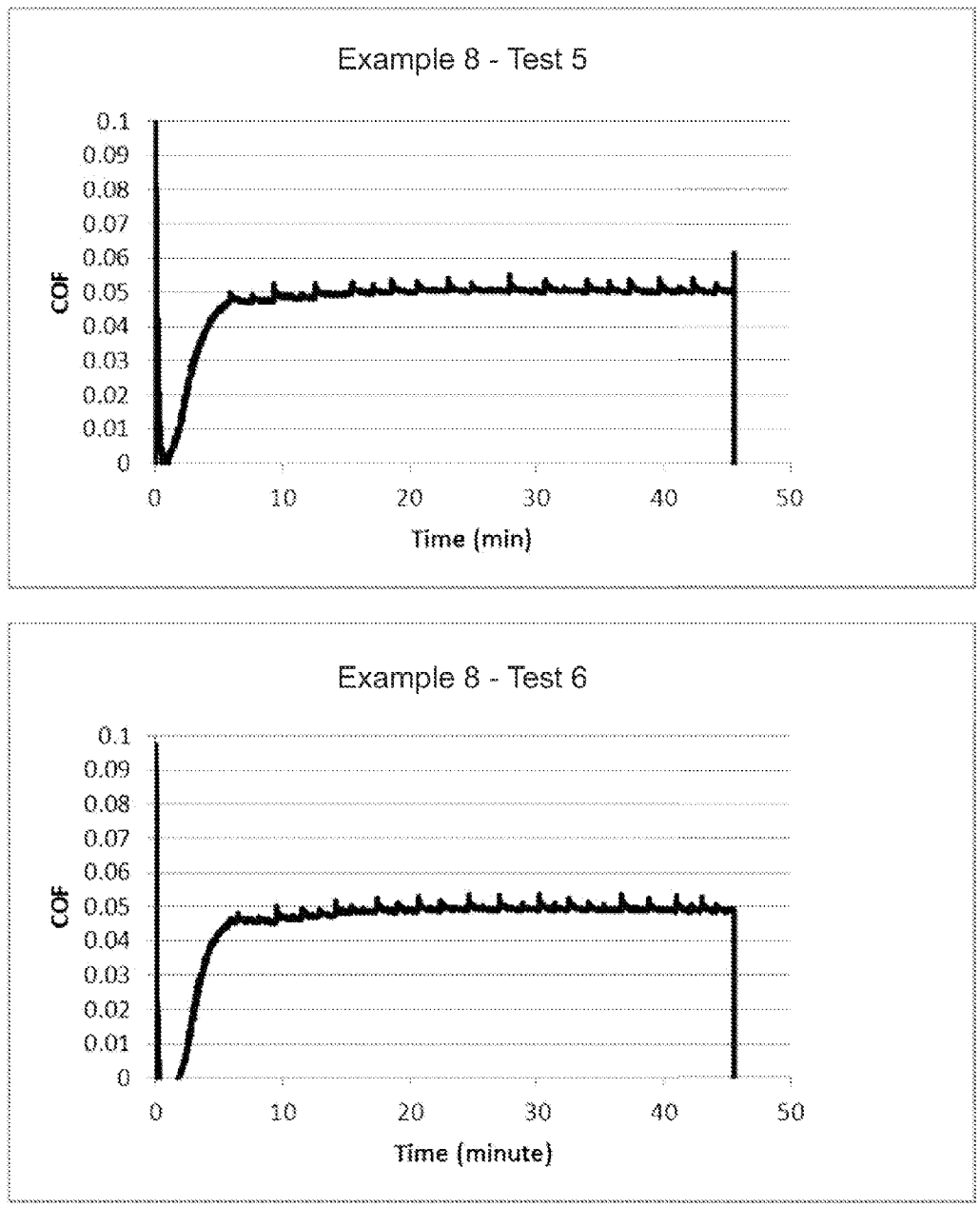
Figure 14D:
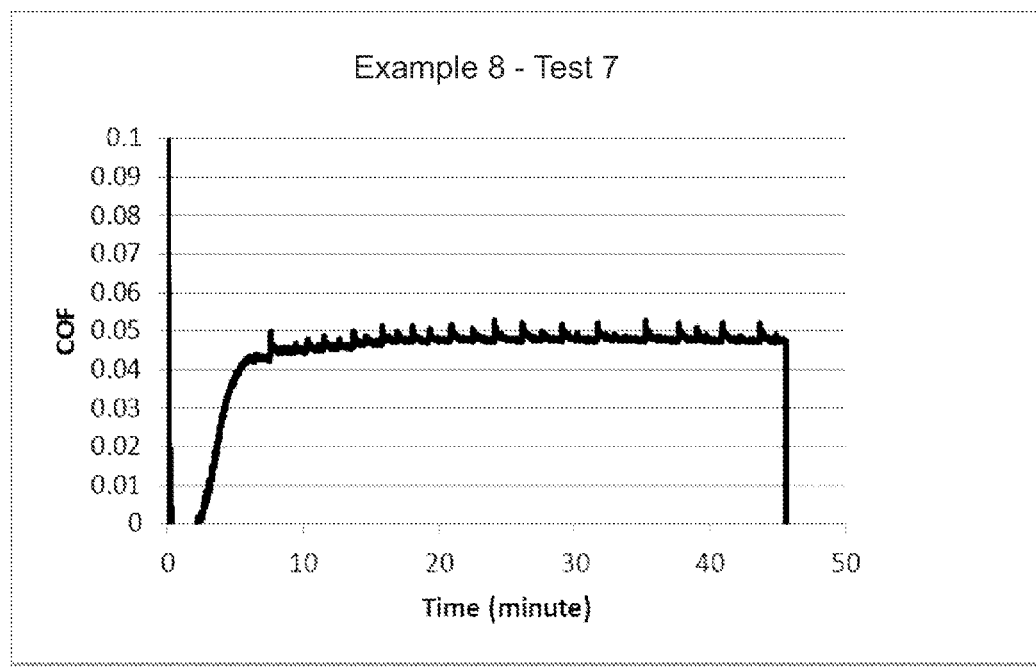
Figure 15A:
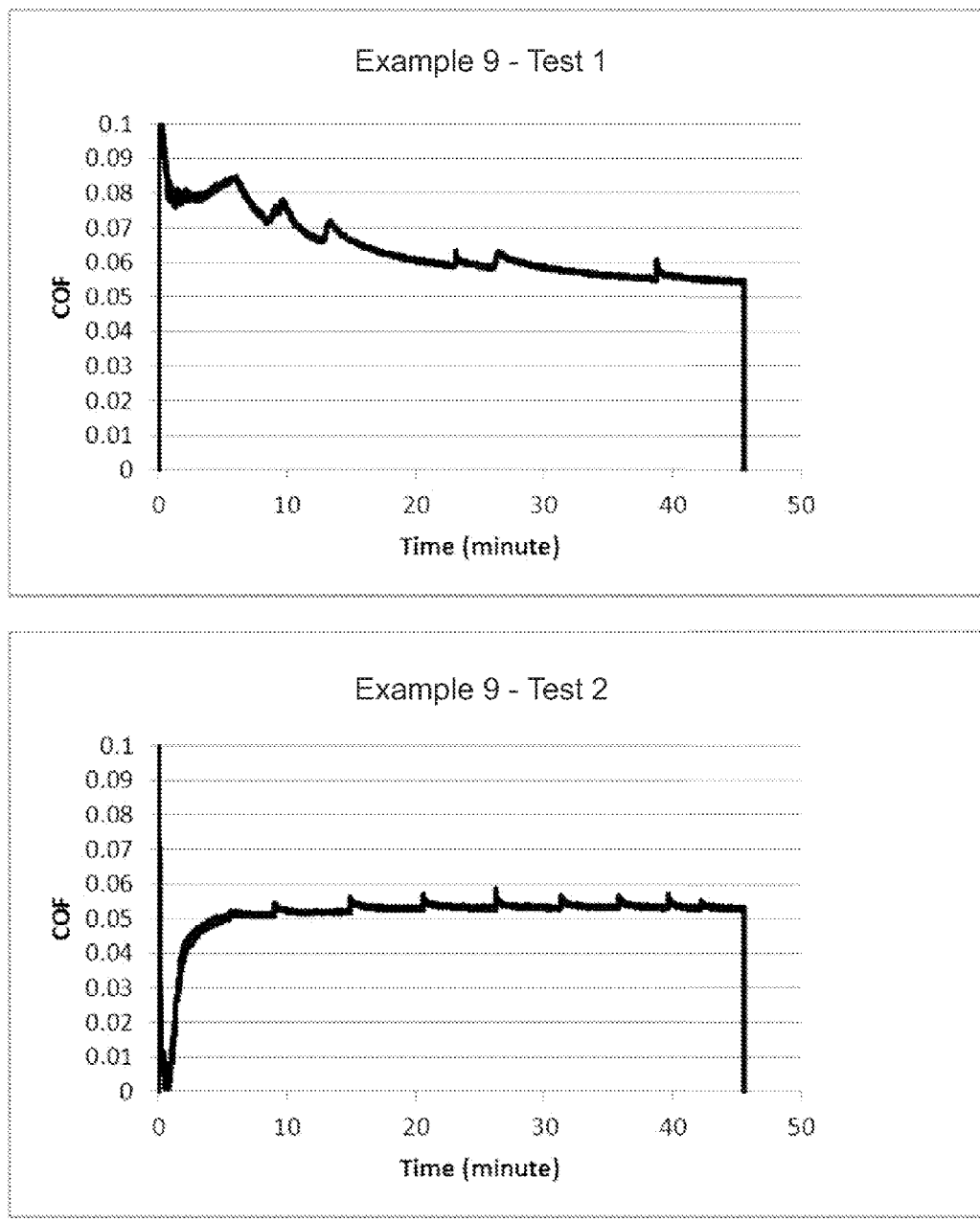
FIGS. 15A and 15B are graphs charting the COF as a function of time during wear-in of thrust bearing apparatus Example 9.
Figure 15B:
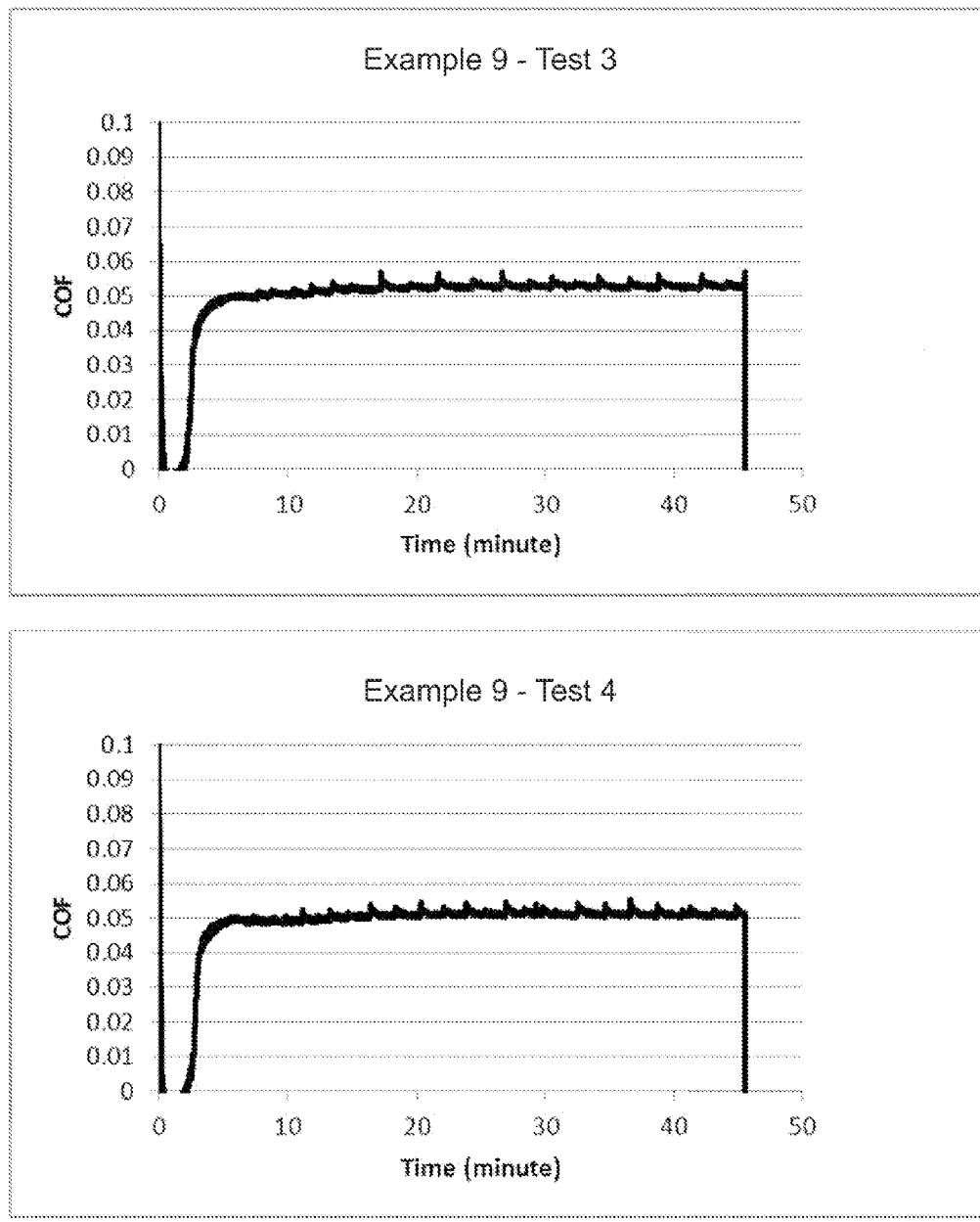
Figure 16:
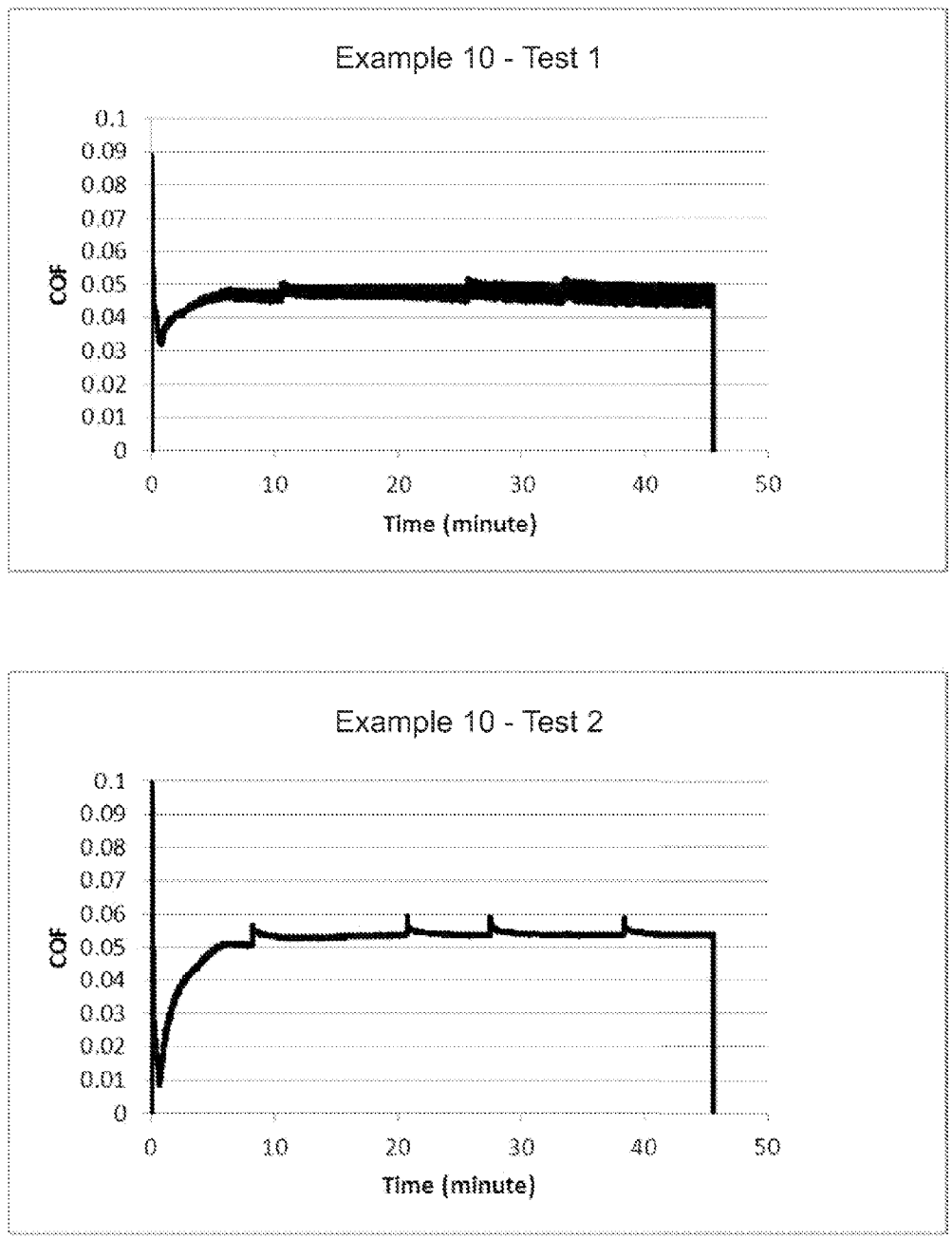
FIG. 16 are graphs charting the COF as a function of time during wear-in of thrust bearing apparatus Example 10.
Figure 17:
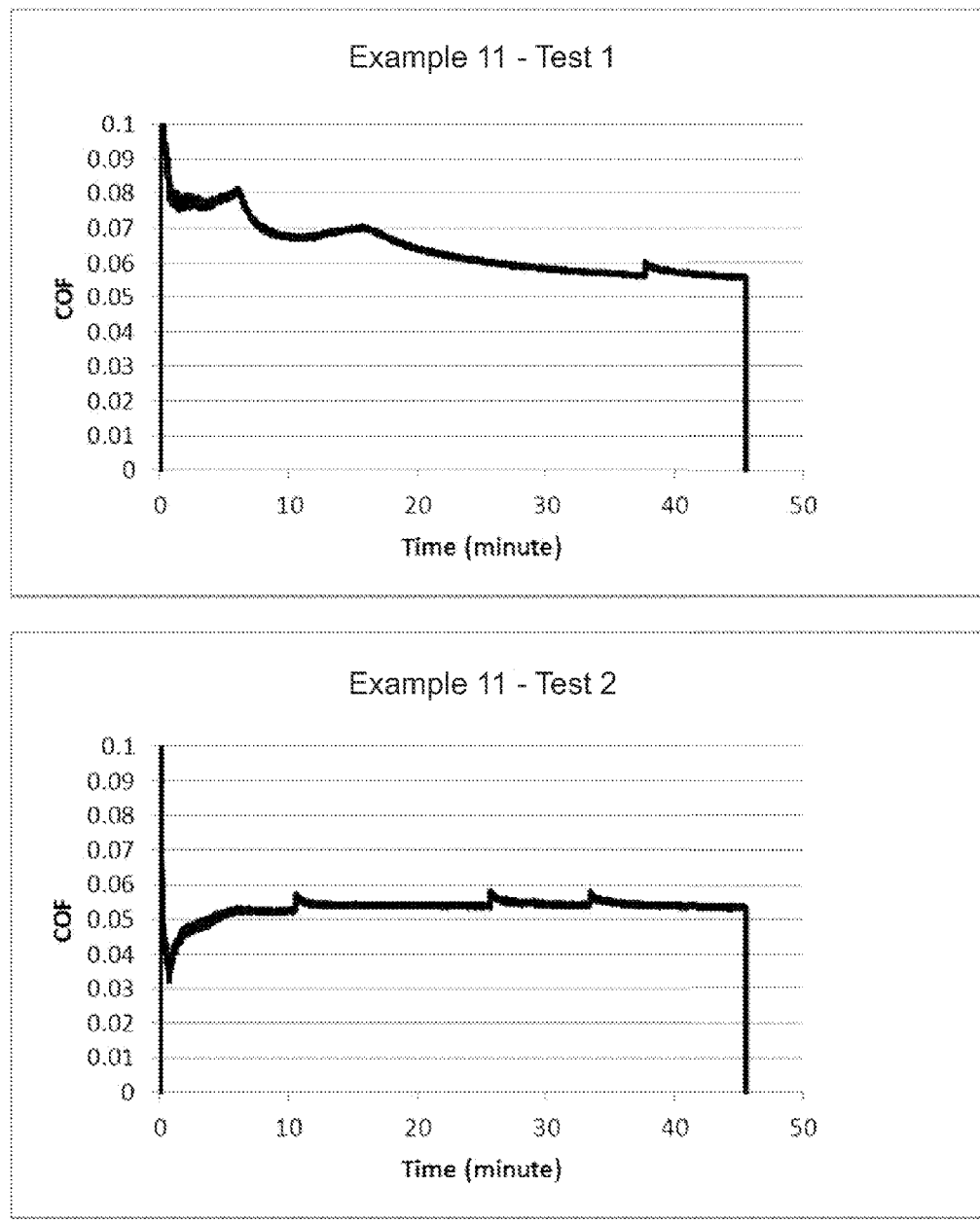
FIG. 17 are graphs charting the COF as a function of time during wear-in of thrust bearing apparatus Example 11.
Figure 18:
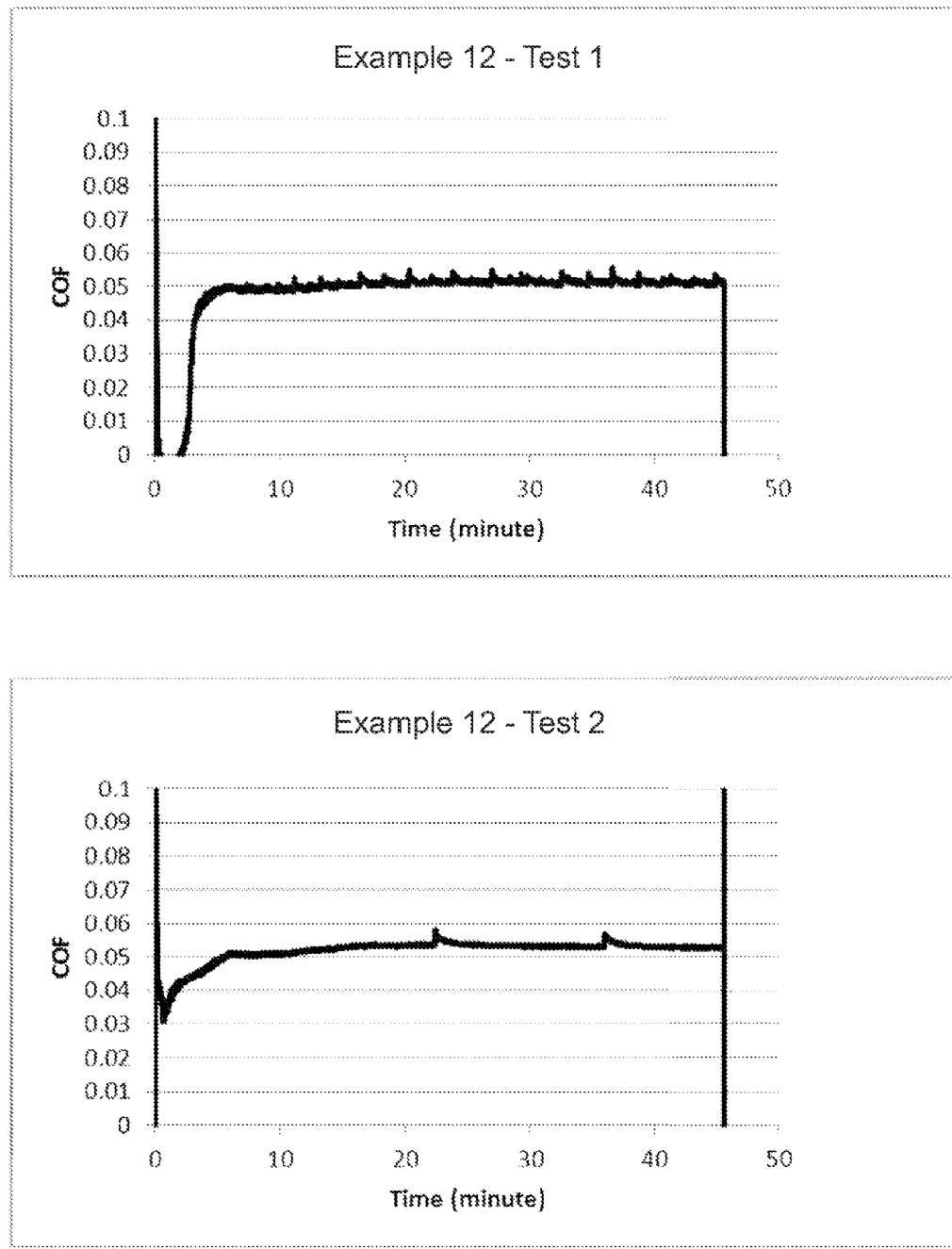
FIG. 18 are graphs charting the COF as a function of time during wear-in of thrust bearing apparatus Example 12.

One may observe that during the ramp-up portion of the cycle, when the applied load is relatively low, the COF may be quite low (e.g., 0.01-0.03), for example as shown in Example 2-Test 3 and Example 2-Test 4 of FIG. 8B, and a fluid film may develop between the bearing surfaces at relatively low loads. As the applied load increases, the COF rises back to approximately where it was at the end of the previous cycle, dropping slowly and steadily throughout the duration of the test as the superhard bearing surfaces reach 95% polished. By the end of the last cycle of each example (which corresponds to a "worn-in" condition), the COF for each example ranged between about 0.04 and about 0.055.

In an embodiment, at the point of being "worn-in", the COF has a value of no more than about 0.06, no more than about 0.055, no more than about 0.05, or about 0.01 to about 0.06, about 0.02 to about 0.04, about 0.01 to about 0.025, or about 0.015 to about 0.03. In another embodiment, the COF is reduced by at least about 10%, at least about 15%, or at least about 20%. Of course, further reduction in the COF is possible as will be described below in conjunction with FIG. 19.

Figure 19:
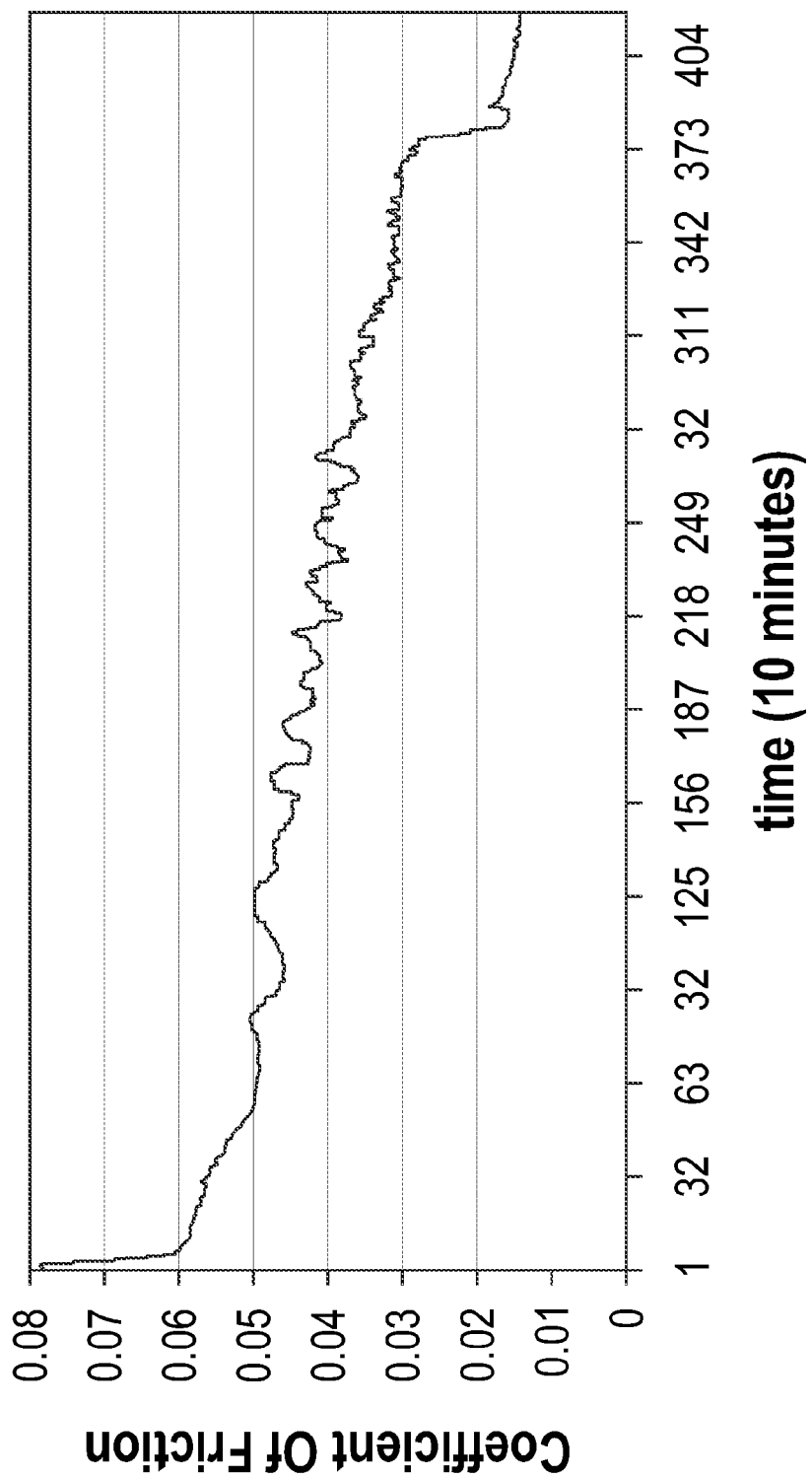
FIG. 19 is a graph charting the COF as a function of time for a PDC bearing as it is worn-in according to the method shown in FIG. 1.

FIG. 19 is a graph charting the COF over time for a bearing similar to that described above in Example 7, but charting the COF for a significantly longer time. As seen, over time, the COF drops even further after being worn in. After the approximately 2 hours of wear-in time shown in Table I, the COF has dropped down to about 0.06, well below the 0.08 at which the COF began. Even though hydrodynamic or nearly hydrodynamic operation may begin to be exhibited when the bearing surfaces exhibit a polished surface (e.g., 95% of the radial width being polished) and at a COF of about 0.06 or 0.055 as shown in FIG. 19 and Example 7, further reduction in the COF, with even more complete hydrodynamic operation, occurs as the bearing surfaces continue to lap or rub against one another. For example, after a period of about 65 to 70 hours, the COF is only about 0.015, which is about 5.3 times less than the initial COF of 0.08 (i.e., an 81% reduction).

Figure 20:
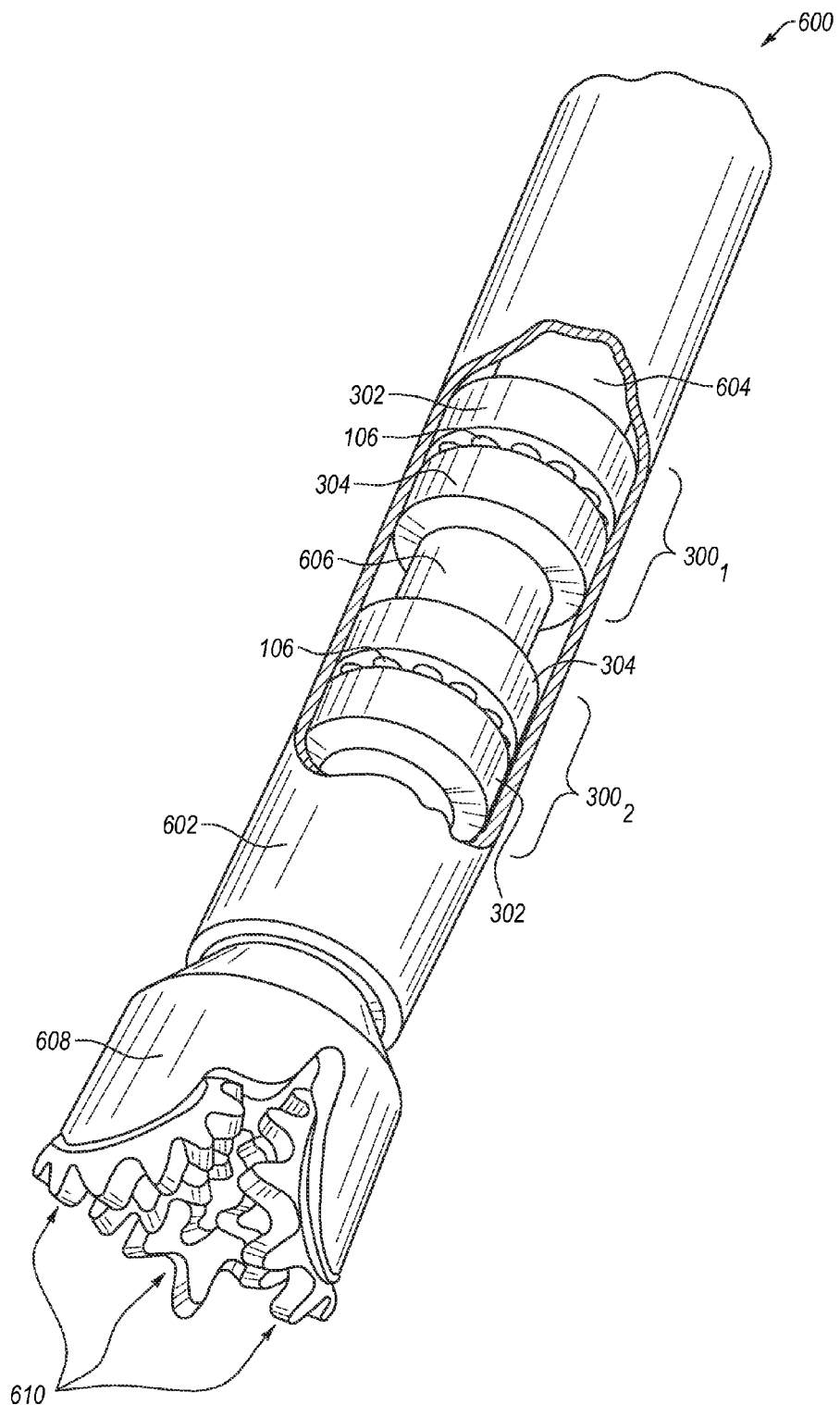
FIG. 20 is a schematic isometric cutaway view of an embodiment of a subterranean drilling assembly that may include one or more of the disclosed thrust-bearing apparatuses.

Any of the embodiments for thrust-bearing apparatuses disclosed herein may be used in a subterranean drilling system. FIG. 20 is a schematic isometric cutaway view of a subterranean drilling system 600 that includes one or more of the disclosed thrust-bearing apparatuses. The subterranean drilling system 600 includes a housing 602 enclosing a downhole drilling motor 604 (i.e., a motor, turbine, or any other device capable of rotating an output shaft) that is operably connected to an output shaft 606. A first thrust-bearing apparatus $300_1$ (e.g., the thrust-bearing apparatus of FIG. 5A) is operably coupled to the downhole drilling motor 604. A second thrust-bearing apparatus $300_2$ (e.g., the thrust-bearing apparatus of FIG. 5A) is operably coupled to the output shaft 606. A rotary drill bit 608 configured to engage a subterranean formation and drill a borehole is connected to the output shaft 606. The rotary drill bit 608 is shown as a roller cone bit including a plurality of roller cones 610. However, other embodiments may utilize different types of rotary drill bits, such as a so-called "fixed cutter" drill bit. As the borehole is drilled with the rotary drill bit 608, pipe sections may be connected to the subterranean drilling system 600 to form a drill string capable of progressively drilling the borehole to a greater depth within the earth.

A thrust-bearing assembly 302 of the thrust-bearing apparatus $300_1$ is configured as a rotor that is attached to the output shaft 606 and rotates with the output shaft 606 and a thrust-bearing assembly 304 of the thrust-bearing apparatus $300_1$ is configured as a stator that does not rotate. The on-bottom thrust generated when the drill bit 608 engages the bottom of the borehole may be carried, at least in part, by the first thrust-bearing apparatus $300_1$. A thrust-bearing assembly 302 of the thrust-bearing apparatus $300_2$ is configured as a rotor that is attached to the output shaft 606 and rotates with the output shaft 606 and a thrust-bearing assembly 304 of the thrust-bearing apparatus 300₂ is configured as a stator that does not rotate relative to the motor housing. Fluid flow through the power section of the downhole drilling motor 604 may cause what is commonly referred to as "off-bottom thrust," which may be carried, at least in part, by the second thrust-bearing apparatus 300₂.

In operation, drilling fluid may be circulated through the downhole drilling motor 604 to generate torque and effect rotation of the output shaft 606 and the rotary drill bit 608 attached thereto so that a borehole may be drilled. A portion of the drilling fluid may also be used to lubricate opposing bearing surfaces of the bearing elements 106 of the thrust-bearing assemblies 302.

Although the thrust-bearing assemblies and thrust-bearing apparatuses described above have been discussed in the context of subterranean drilling systems and applications, in other embodiments, the thrust-bearing assemblies and thrust-bearing apparatuses disclosed herein are not limited to such use and may be used for many different applications, if desired, without limitation. Thus, such thrust-bearing assemblies and thrust-bearing apparatuses are not limited for use with subterranean drilling systems and may be used with various other mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method, comprising:
   receiving a thrust-bearing apparatus comprising first and second thrust-bearing assemblies, each of the first and second thrust-bearing assemblies including:
      a support ring; and
      a plurality of superhard bearing elements each of which includes a bearing surface, the plurality of superhard bearing elements mounted to the support ring and distributed circumferentially about a thrust axis;
      wherein the bearing surfaces of each thrust-bearing bearing assembly are generally opposed to one another; and
   operating the thrust bearing apparatus to wear-in the bearing surfaces of the first and second thrust-bearing assemblies such that at least a majority of a radial width of respective bearing surfaces of the bearing elements of each thrust-bearing assembly substantially correspond to one another to allow at least near hydrodynamic operation;
   wherein the operation of the thrust-bearing apparatus is not hydrodynamic during a first time period before the wearing-in of the superhard bearing elements is complete.

2. The method of claim 1 wherein the support ring of at least one of the bearing assemblies comprises at least one thermal-warping-reducing feature configured to reduce a radial moment, compared to if the at least one thermal-warping-reducing feature were absent from the support ring, which is thermally induced in the support ring when the support ring and the plurality of superhard bearing elements are exposed to operational temperature conditions.

3. The method of claim 1 wherein during at least nearly hydrodynamic operation, the fluid film extends over at least about 50% of the surface area of the bearing surfaces between the first thrust-bearing assembly and the second thrust-bearing assembly.

4. The method of claim 1 wherein the bearing surfaces of the superhard bearing elements are manufactured to an initial surface roughness between about 20 microinch and about 45 microinch.

5. The method of claim 4 wherein the bearing surfaces of the superhard bearing elements are manufactured to an initial surface roughness between about 25 microinch and about 40 microinch.

6. The method of claim 4 wherein the bearing surfaces of the superhard bearing elements are manufactured to an initial surface roughness between about 30 microinch and about 35 microinch.

7. The method of claim 4 wherein the bearing surfaces of the superhard bearing elements exhibit a surface roughness after being worn-in that is less than that exhibited immediately after manufacture.

8. The method of claim 4 wherein the bearing surfaces of the superhard bearing elements exhibit a surface roughness between about 0.1 microinch and about 10 microinch after being worn-in.

9. The method of claim 4 wherein the bearing surfaces of the superhard bearing elements exhibit a surface roughness between about 0.5 microinch and about 5 microinch after being worn-in.

10. The method of claim 4 wherein the bearing surfaces of the superhard bearing elements exhibit a surface roughness between about 1 microinch and about 3 microinch after being worn-in.

11. The method of claim 1 wherein the bearing surfaces of the superhard bearing elements are manufactured to an initial surface roughness by lapping the bearing surfaces of the superhard bearing elements.

12. The method of claim 1 wherein wearing-in of the bearing surfaces is completed within less than about 3 hours.

13. The method of claim 1 wherein wearing-in of the bearing surfaces is completed within about 2 hours or less.

14. The method of claim 1 wherein wearing-in of the bearing surfaces is performed under a thrust load of at least about 5,000 lbs.

15. The method of claim 1 wherein wearing-in of the bearing surfaces is performed at a rotational speed of at least about 60 RPM.

16. The method of claim 1 wherein substantially all of the radial width of the bearing surfaces of the superhard bearing elements of each thrust-bearing assembly substantially correspond to one another upon wearing-in.

17. The method of claim 1 wherein upon wearing-in, the coefficient of friction of the bearing surfaces of the superhard bearing elements of each thrust-bearing assembly is no more than about 0.06.

18. A method, comprising:
   providing a thrust-bearing apparatus comprising first and second thrust-bearing assemblies, each of the first and second thrust-bearing assemblies including:
      a support ring; and
      a plurality of superhard bearing elements each of which includes a bearing surface, the plurality of superhard bearing elements mounted to the support ring and distributed circumferentially about a thrust axis;
      wherein the bearing surfaces of each thrust-bearing assembly are generally opposed to one another; and
   operating the thrust-bearing apparatus to wear-in the bearing surfaces of each of the first and second thrust-bearing assemblies to provide for at least near hydrodynamic operation in which a coefficient of friction is no more than about 0.06;

wherein the operation of the thrust-bearing apparatus is not hydrodynamic during a first time period before the wearing-in of the superhard bearing elements is complete.

19. The method of claim 18 wherein substantially all of the radial width of the bearing surfaces of the superhard bearing elements of each thrust-bearing assembly substantially correspond to one another upon wearing-in.

20. The method of claim 18 wherein upon wearing-in the coefficient of friction of the bearing surfaces of the superhard bearing elements of each thrust-bearing assembly is no more than about 0.05.

* * * * *